(12) United States Patent
Bui Dac et al.

(10) Patent No.: US 11,316,961 B2
(45) Date of Patent: Apr. 26, 2022

(54) ELECTRONIC DEVICE INCLUDING HOUSING STRUCTURE

(71) Applicant: SAMSUNG ELECTRONICS CO., LTD., Suwon-si (KR)

(72) Inventors: Tri Bui Dac, Hai Duong (VN); Hoang Nguyen Van, Hanoi (VN); Truong Dao Xuan, Hanoi (VN); Chon Le Xuan, Quang Ninh (VN); Huy Ngo Van, Vinh Phuc (VN); Quynh Nguyen Dinh, Bac Ninh (VN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 16/933,168

(22) Filed: Jul. 20, 2020

(65) Prior Publication Data
US 2021/0044685 A1 Feb. 11, 2021

(30) Foreign Application Priority Data
Aug. 5, 2019 (KR) .......... 10-2019-0095166

(51) Int. Cl.
*G06F 1/16* (2006.01)
*H04M 1/02* (2006.01)

(52) U.S. Cl.
CPC ........ *H04M 1/0266* (2013.01); *G06F 1/1637* (2013.01); *H04M 2250/22* (2013.01)

(58) Field of Classification Search
CPC ............ H04M 1/0266; H04M 2250/22; G06F 1/1637
See application file for complete search history.

(56) References Cited

U.S. PATENT DOCUMENTS

| 9,473,604 | B2 | 10/2016 | Choi et al. | |
|---|---|---|---|---|
| 9,872,407 | B2 | 1/2018 | Inobe et al. | |
| 10,897,827 | B2* | 1/2021 | Cho | G06F 1/1637 |
| 2016/0156755 | A1* | 6/2016 | Choi | G06F 1/1637 |
| | | | | 455/575.1 |
| 2017/0196108 | A1* | 7/2017 | Inobe | H05K 5/03 |
| 2017/0251086 | A1* | 8/2017 | Gagne-Keats | C09J 131/04 |

* cited by examiner

*Primary Examiner* — Robert J Hoffberg
*Assistant Examiner* — Hung Q Dang
(74) *Attorney, Agent, or Firm* — Sughrue Mion, PLLC

(57) ABSTRACT

An electronic device includes a transparent member arranged on at least one of a front surface or a rear surface of the electronic device and including a first region facing a display module, a housing surrounding the transparent member, including a sidewall extending in a circumferential direction of the electronic device, and forming an exterior of the electronic device, and protruding portions protruding toward the transparent member from the sidewall and extending in the circumferential direction of the electronic device, wherein a distance between the protruding portions facing each other with the transparent member therebetween is less than a width of the transparent member arranged between the protruding portions.

19 Claims, 20 Drawing Sheets

ELECTRONIC DEVICE INCLUDING HOUSING STRUCTURE

CROSS-REFERENCE TO RELATED APPLICATION(S)

This application is based on and claims priority under 35 U.S.C. § 119 to Korean Patent Application No. 10-2019-0095166, filed on Aug. 5, 2019, in the Korean Intellectual Property Office, the disclosure of which is incorporated by reference herein in its entirety.

BACKGROUND

1. Field

The disclosure relates to an electronic device including a housing structure.

2. Description of Related Art

An electronic device may include a display module having a frontward screen, window glass protecting the display module, and a housing surrounding an edge of the window glass. The electronic device may further include a rear case arranged on the rear of the housing and rear glass arranged on the rear of the rear case to provide an aesthetic sense to a rear surface of the electronic device.

Although a bezel region for coupling the window glass with the housing has been gradually reduced to satisfy consumers' demands recently, an adhesion strength greater than a certain value may be difficult to achieve.

To satisfy exterior and strength properties of the electronic device, a bonding material for coupling the window glass with the housing may be arranged between the window glass and the housing.

However, in the electronic device, the bonding material may leak outside between the window glass and the housing, and thus, the bonding material may be visually identified by a user.

SUMMARY

Provided is an electronic device with improved coupling strength between window glass and a housing while also having an aesthetic sense.

Additional aspects will be set forth in part in the description which follows and, in part, will be apparent from the description, or may be learned by practice of the presented embodiments.

In accordance with an aspect of the disclosure, there is provided an electronic device including a transparent member arranged on at least one of a front surface or a rear surface of the electronic device and including a first region facing a display module, a housing surrounding the transparent member, including a sidewall extending in a circumferential direction of the electronic device, and forming an exterior of the electronic device, and protruding portions protruding toward the transparent member from the sidewall and extending in the circumferential direction of the electronic device, wherein a distance between the protruding portions facing each other with the transparent member therebetween is less than a width of the transparent member arranged between the protruding portions, and top end portions of the protruding portions are located higher than a first region of the transparent member in a thickness direction of the electronic device.

The protruding portions may include first protruding regions extending in an up-down direction of the electronic device, the up-down direction being perpendicular to the thickness direction of the electronic device, the transparent member may include a left-right width extending in a left-right direction that is perpendicular to the thickness direction of the electronic device and the up-down direction of the electronic device, and a distance between the first protruding regions facing each other with the transparent member therebetween may be less than the left-right width of the transparent member.

The protruding portions may include second protruding regions extending in a left-right direction of the electronic device, the left-right direction being perpendicular to the thickness direction of the electronic device, the transparent member may include an up-down width extending in an up-down direction that is perpendicular to the thickness direction of the electronic device and the left-right direction of the electronic device, and a distance between the second protruding regions facing each other with the transparent member therebetween may be less than the up-down width of the transparent member.

The transparent member may include a second region in an edge of the first region and including a certain thickness, and the second region of the transparent member includes a first opposing surface facing the sidewall and a second opposing surface facing the protruding portions.

The electronic device may further include a moving path located between the second opposing surface and the protruding portions and in which the bonding member moves, wherein the moving path is located in a step region arranged between the top end portions of the protruding portions and the first region of the transparent member.

The top end portions of the protruding portions may be located at the same positions as or lower than a bottom end portion of the first opposing surface in the thickness direction of the electronic device.

The second opposing surface may be a sloped surface forming a certain angle with respect to the front or the rear of the electronic device, and the protruding portions may include inclined surfaces opposite to the second opposing surface.

Inclinations of the second opposing surface and the inclined surfaces with respect to the front or the rear of the electronic device may be the same as or different from each other The second opposing surface may be a sloped surface forming a certain angle with respect to the front or the rear of the electronic device, and the protruding portions may include curved surfaces opposite to the second opposing surface.

The curved surfaces may be located under a virtual plane extending in parallel with the sloped surface.

The second opposing surface may be a curved surface including a certain curvature, and the protruding portions may include curved surfaces opposite to the second opposing surface.

A curvature of the second opposing surface may be the same as or different from a curvature of the curved surfaces of the protruding portions.

The electronic device may further include a plurality of projection portions arranged on one or more of the second opposing surface and the inclined surfaces.

The electronic device may further include a coating portion arranged on one or more of the second opposing surface and the inclined surfaces to increase a frictional force with the bonding member.

The protruding portions may include top surface portions of planar shapes and connected to the sidewall and top end portions of the inclined surfaces.

The electronic device may further include a transparent member support portion extending in a circumferential direction of the transparent member and supporting a bottom surface of the transparent member.

The electronic device may further include a bonding member accommodating portion arranged between the protruding portions and the transparent member support portion to accommodate the bonding member.

The bonding member accommodating portion may include a bonding member accommodating surface located lower than the transparent member in the thickness direction of the electronic device and a bonding member accommodating groove located lower than the bonding member accommodating surface in the thickness direction of the electronic device.

The bonding member accommodating groove may include a first accommodating groove region located lower than the bonding member accommodating surface in the thickness direction of the electronic device and a second accommodating groove region located lower than the protruding portions in the thickness direction of the electronic device.

A cross-section of the bonding member accommodating groove may include one or more of a triangular shape, a rectangular shape, and a semi-circular shape.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
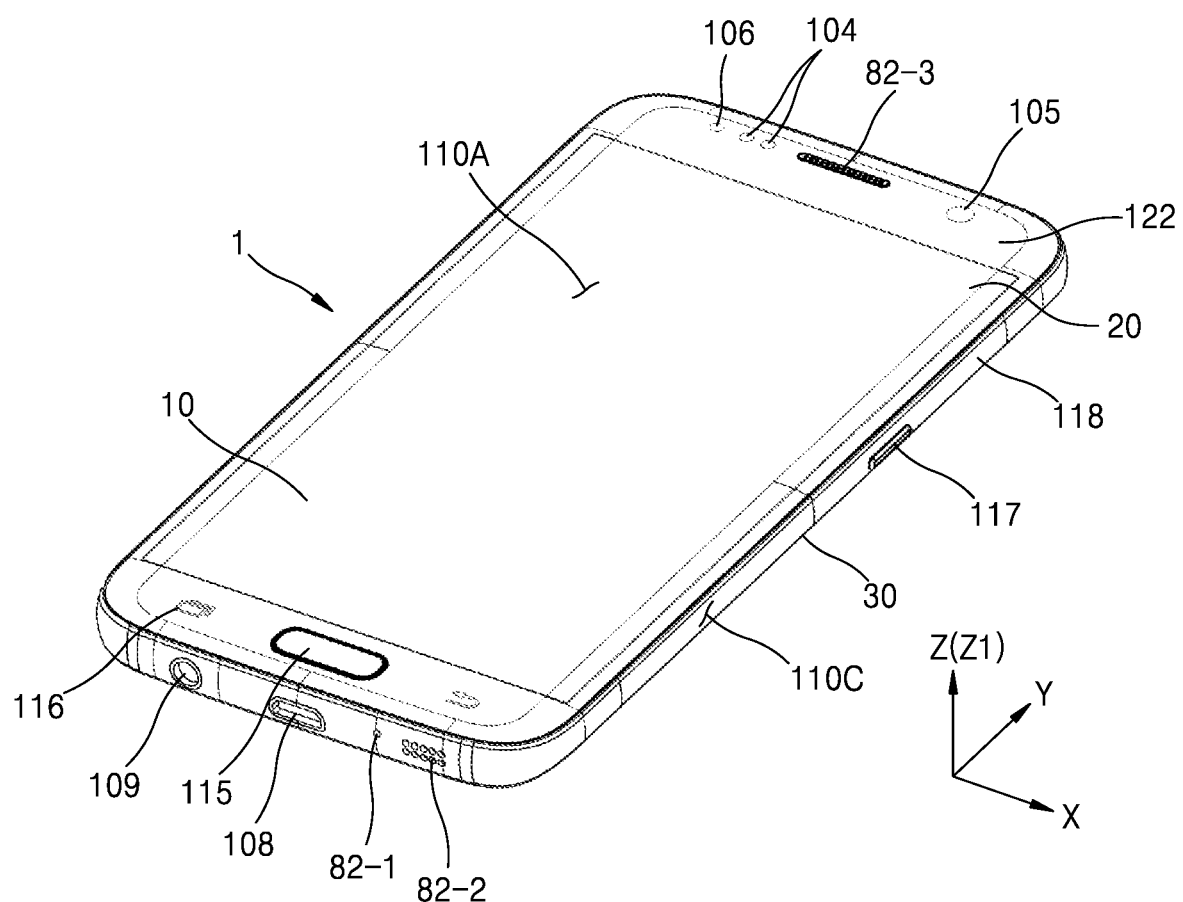
FIG. 1A is a perspective view of a front surface of a mobile electronic device, according to an embodiment.

Hereinafter, structures and operations of the disclosure will be described in detail with reference to embodiments of the disclosure of the accompanying drawings.

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, when it is assumed that a certain part includes a certain component, the term 'including' means that a corresponding component may further include other components unless a specific meaning opposed to the corresponding component is written.

As used herein, the terms "1st" or "first" and "2nd" or "second" may use corresponding components regardless of importance or order and are used to distinguish one component from another without limiting the components.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

An electronic device according to various embodiments of the disclosure may include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, mobile medical equipment, a camera, or a wearable device (e.g., smart glasses, a head-mounted-device (HMD), electronic clothes, an electronic bracelet, an electronic necklace, an electronic appcessory, electronic tattoos, a smart mirror, or a smart watch).

According to some embodiments of the disclosure, the electronic device may be a smart home appliance. The electronic device may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, or an electronic frame.

The electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), or Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments of the disclosure, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the disclosure may be one of the above-listed devices or a combination thereof. The electronic device according to some embodiments of the disclosure may be a flexible electronic device. The electronic device according to various embodiments of the disclosure is not limited to the above-listed devices and may include new electronic devices according to technical development.

Hereinafter, an electronic device according to various embodiments of the disclosure will be described with reference to the accompanying drawings. Herein, the term "user" used in various embodiments of the disclosure may refer to a person who uses the electronic device or a device using the electronic device (e.g., an artificial intelligence electronic device).

Figure 1B:
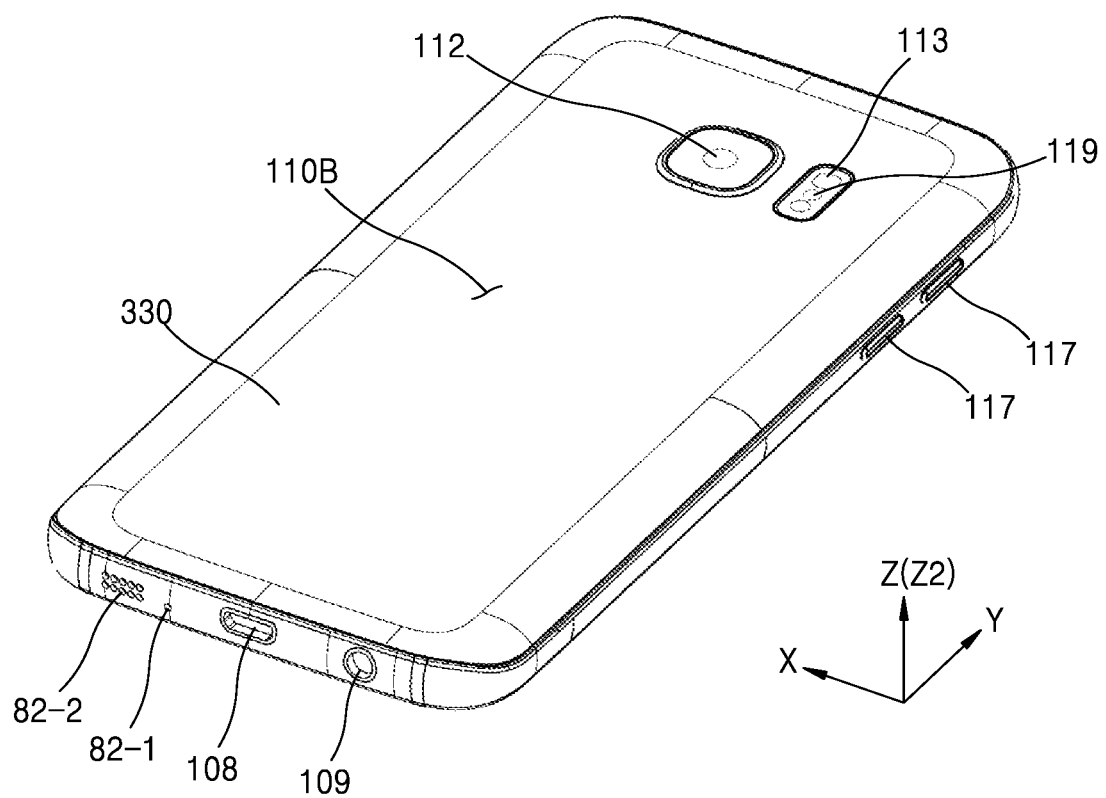
FIG. 1B is a perspective view of a rear surface of the electronic device of FIG. 1A.
Figure 2:
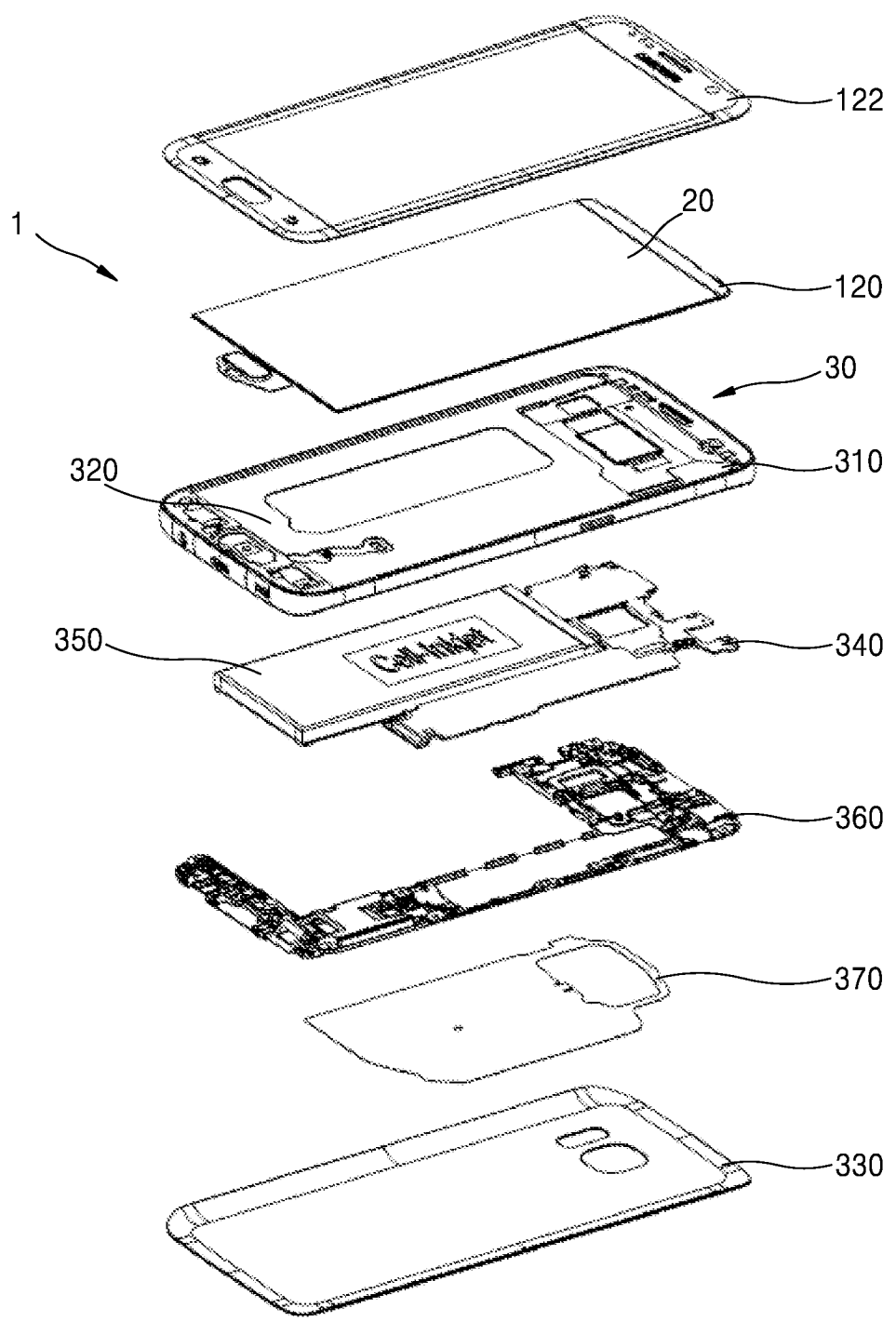
FIG. 2 is an exploded perspective view of the electronic device of FIG. 1A, according to an embodiment.
Figure 3:
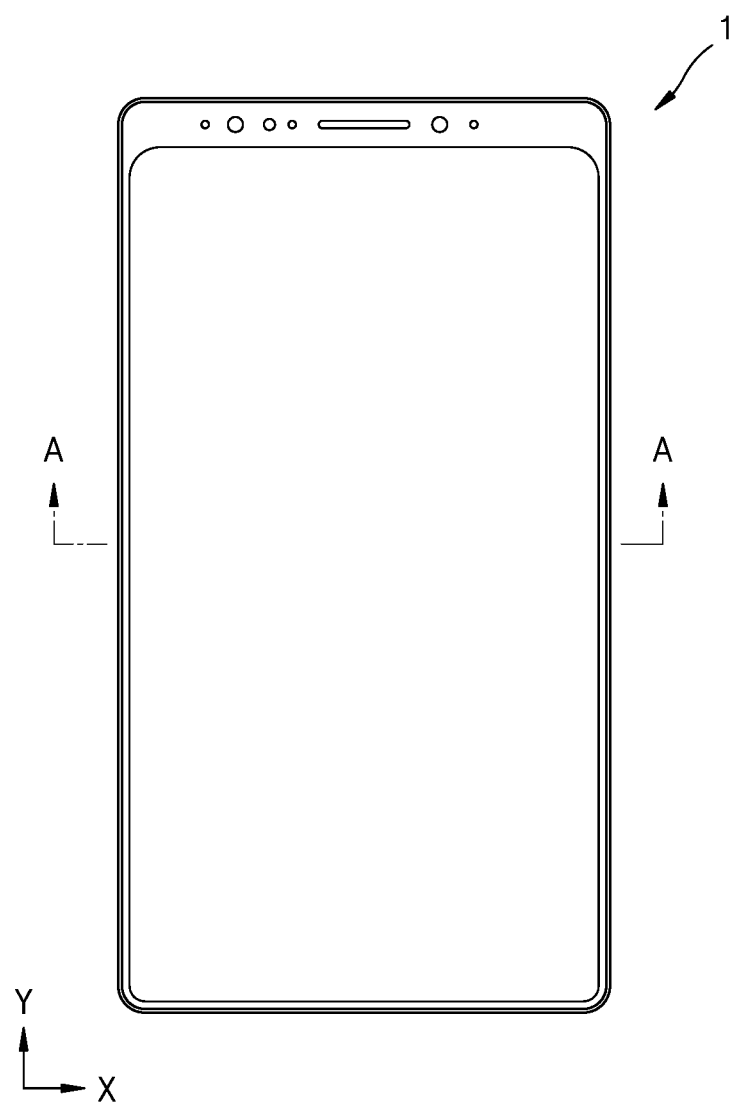
FIG. 3 is a perspective view of an electronic device according to an embodiment.
Figure 4A:
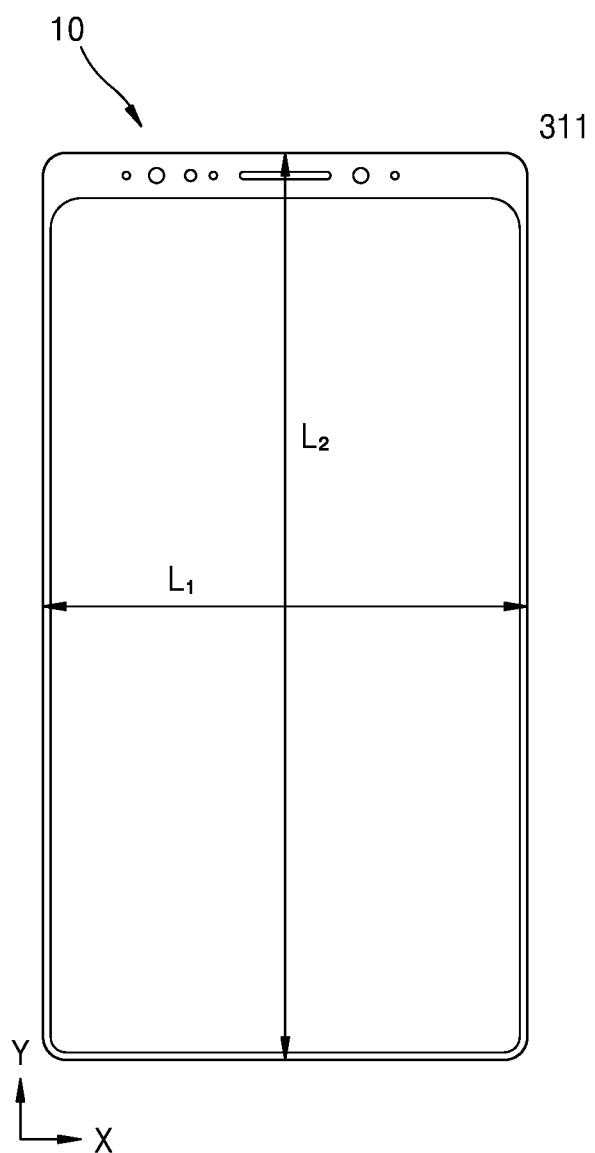
FIGS. 4A and 4B are schematic plane views of a transparent member and a housing, according to an embodiment.
Figure 4B:
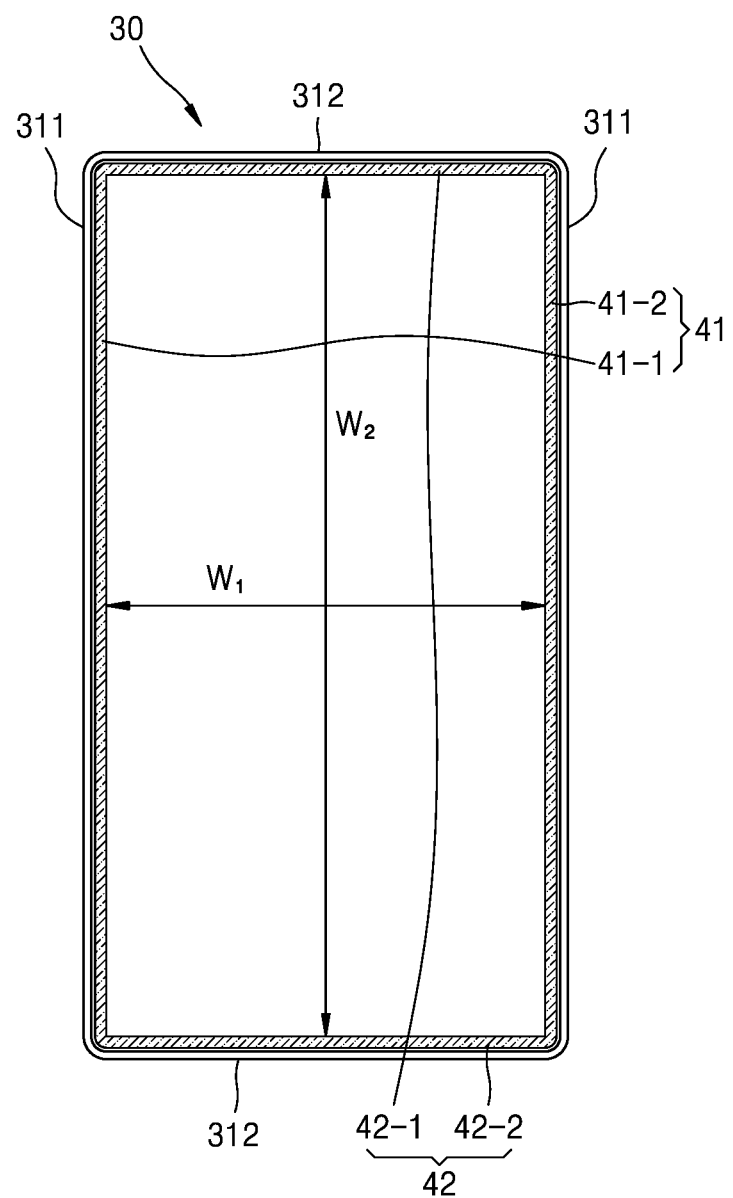
Figure 4C:
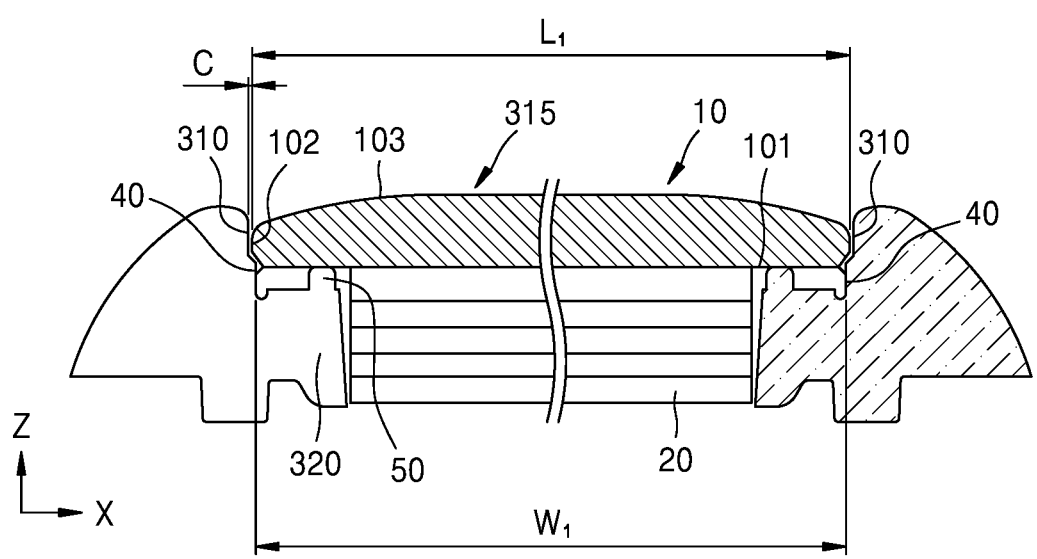
FIG. 4C is a cross-sectional view of the electronic device of FIG. 3, cut along a line A-A, according to an embodiment.
Figure 5:
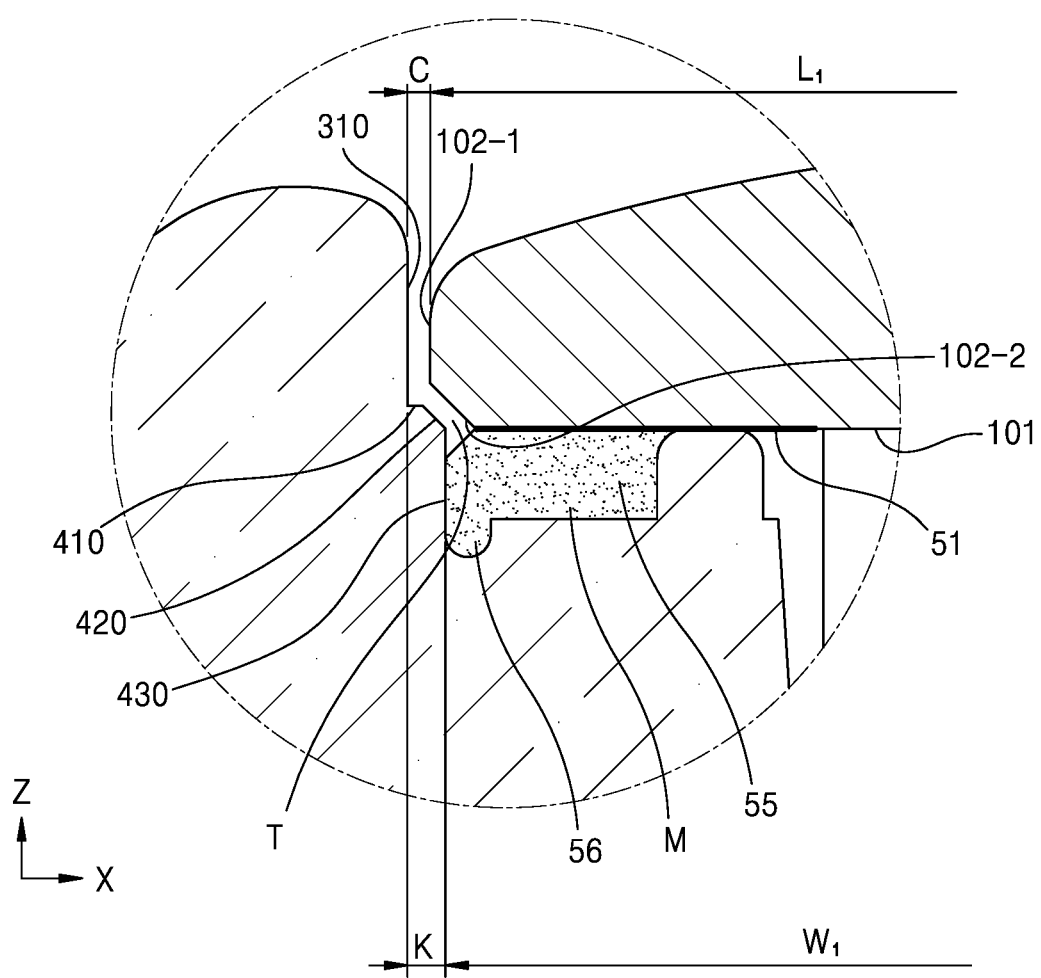
FIG. 5 is a cross-sectional view of a housing and a transparent member, according to an embodiment.

FIG. 1A is a perspective view of a front surface of a mobile electronic device 1, according to an embodiment. FIG. 1B is a perspective view of a rear surface of the electronic device 1 of FIG. 1A. FIG. 2 is an exploded perspective view of the electronic device 1 of FIG. 1A. FIG. 3 is a perspective view of the electronic device 1 according to an embodiment, and FIGS. 4A and 4B are schematic plane views of a transparent member 10 and a housing 30, according to an embodiment. FIG. 4C is a cross-sectional view of the electronic device 1 of FIG. 3, cut along a line A-A. FIG. 5 is a cross-sectional view of the housing 30 and the transparent member 10, according to an embodiment.

Referring to FIGS. 1A and 1B, the electronic device 1 according to an embodiment may include the housing 30 that includes a first surface (e.g., a front surface) 110A, a second surface (e.g., a rear surface) 110B, and a side surface 110C surrounding a space between the first surface 110A and the second surface 110B.

Herein, the first surface 110A of the electronic device 1 may be defined as a surface viewed when a user uses the electronic device 1 in a normal state, and the second surface 110B of the electronic device 1 may be defined as a surface opposite to the first surface 110A. A front direction Z1 may be defined as a direction facing the user when the user uses the electronic device 1 in the normal state, and a rear direction Z2 may be defined as a direction opposite to the front direction Z1.

In another embodiment (not shown) of the disclosure, the housing 30 may refer to a structure that forms some of the first surface 110A, the second surface 110B, and the side surface 110C of FIG. 1. According to an embodiment, the first surface 110A may be formed by a front plate 122, at least a part of which is substantially transparent (for example, a glass plate including various coating layers or a polymer plate). The second surface 110B may be formed by a rear case 330 that is substantially opaque. The rear case 330 may be formed by, for example, coated or painted glass, ceramic, polymer, metal (e.g., aluminum, stainless steel (STS), or magnesium) or a combination of at least two of the listed materials. The side surface 110C may be formed by a side bezel structure (or a "side member") 118 including metal and/or polymer. In an embodiment, the rear case 330 and the side bezel structure 118 may be formed as one piece and may include the same material (e.g., a metal material such as aluminum).

According to an embodiment, the electronic device 1 may include at least one of the transparent member 10, a display module 20, audio modules 82-1, 82-2, and 82-3, sensor modules 104 and 119, camera devices 105, 112, and 113, key input devices 115, 116, and 117, an indicator 106, or connector holes 108 and 109. In an embodiment, the electronic device 1 may exclude at least one (e.g., the key input devices 115, 116, and 117 or the indicator 106) of the components or further include other components.

The transparent member 10 may be arranged in the front direction Z1 of the display module 20. The transparent member 10 may be arranged on the first surface 110A of the electronic device 1. The transparent member 10 may function as a window of the display module 20, and support the display module 20 or prevent damage of the display module 20. Moreover, the transparent member 10 may form the exterior of the electronic device 1, together with the housing 30.

The size of the transparent member 10 may be greater than the size of the display module 20. An opaque layer may be arranged in an outermost part of the transparent member 10. The opaque layer may be a black matrix.

The transparent member 10 may include a transparent glass material such that a screen displayed on the display module 20 is exposed outside. The transparent member 10 may include tempered glass. However, the material of the transparent member 10 is not limited to a glass material, and may be any other materials that are transparent. For example, the transparent member 10 may be acryl, a sapphire material, a synthetic resin material, or a ceramic material.

The display module 20 may be exposed through the most part of, for example, the front plate 122. The display module 20 may be coupled with or arranged adjacent to a touch sensing circuit, a pressure sensor capable of measuring a strength (pressure) of a touch, and/or a digitizer for detecting a stylus pen of a magnetic-field type.

The display module 20 may have a length in a vertical (up-down) direction (y direction), which is greater than a length in a horizontal (left-right) direction (x direction). However, the shape of the display module 20 may be various without being limited thereto.

The audio modules 82-1, 82-2, and 82-3 may include a microphone hole 82-1 and speaker holes 82-2 and 82-3. Inside the microphone hole 82-1 may be arranged a microphone for obtaining external sound, and may also be arranged a plurality of microphones for sensing a direction of the sound in an embodiment. The speaker holes 82-2 and 82-3 may include an external speaker hole 82-2 and a call receiver hole 82-3. In an embodiment, the speaker holes 82-2 and 82-3 and the microphone hole 82-1 may be implemented as one hole or a speaker may be included without the speaker holes 82-2 and 82-3 (e.g., a piezo speaker).

The sensor modules 104 and 119 generate an electrical signal or data value corresponding to an internal operating state or external environmental state of the electronic device 1. The sensor modules 104 and 119 may include a first sensor module 104 (e.g., a proximity sensor) and/or a second sensor module (not shown, e.g., a fingerprint sensor) arranged on the first surface 110A of the housing 30, and/or a third sensor module 119 (e.g., a heart rate monitor (HRM) sensor) arranged on the second surface 110B of the housing 30. The fingerprint sensor may be arranged on the second surface 110B of the housing 30 as well as the first surface 110A of the housing 30 (e.g., a home key button 115). The electronic device 1 may further include at least one of sensor modules (not shown), e.g., a gesture sensor, a gyro sensor, an atmospheric pressure sensor, a magnetic sensor, an acceleration sensor, a grip sensor, a color sensor, an infrared (IR) sensor, a bio sensor, a temperature sensor, a humidity sensor, and an illuminance.

The camera devices 105, 112, and 113 may include a first camera device 105 arranged on the first surface 110A of the electronic device 1, a second camera device 112 arranged on the second surface 110B, and/or a flash 113. The camera devices 105 and 112 may include one lens or a plurality of lenses, an image sensor, and/or an image signal processor. The flash 113 may include, for example, a light-emitting diode or a xenon lamp. In an embodiment, two or more lenses (an IR camera, a wide lens, and a telephoto lens) and image sensors may be arranged on a surface of the electronic device 1.

The key input devices 115, 116, and 117 may include the home key button 115 arranged on the first surface 110A of the housing 30, a touch pad 116 arranged around the home key button 115, and/or a side key button 117 arranged on the side surface 110C of the housing 30. In an embodiment, the electronic device 1 may exclude some or all of the above-mentioned key input devices 115, 116, and 117, and the excluded key input devices 115, 116, and 117 may be implemented in other forms such as a soft key, etc., on a display 120.

The indicator 106 may be arranged, for example, on the first surface 110A of the housing 30. The indicator 106 may provide state information of the electronic device 1 in the form of light, and may include a light-emitting diode (LED).

The connector holes 108 and 109 may include a first connector hole 108 capable of accommodating a connector (e.g., a universal serial bus (USB) connector) for transmitting and receiving power and/or data with an external electronic device and/or a second connector hole (e.g., an earphone jack) 109 capable of accommodating a connector for transmitting and receiving an audio signal with the external electronic device.

Referring to FIG. 2, the electronic device 1 may include the display module 20, the front plate 122, the housing 30 including a sidewall 310, a support member 320 (e.g., a bracket), and a rear case 330, a printed circuit board 340, a battery 350, a support module 360, and an antenna 370. In an embodiment, the electronic device 1 may exclude at least one (e.g., the support member 320 or the support module 360) of the components or further include other components. At least one of the components of the electronic device 1 may be the same as or similar with at least one of the components of the electronic device 1 of FIG. 1A or 1B, and a repeated description will not be avoided.

The support member 320 may be arranged inside the electronic device 1 and may be connected with the sidewall 310 or may be formed as one piece with the sidewall 310. The support member 320 may be formed of, for example, a metal material and/or a non-metallic (e.g., polymer) material. The support member 320 may be coupled with the display module 20 on a surface thereof and with the printed circuit board 340 on another surface thereof. A processor, a memory, and/or an interface may be mounted on the printed circuit board 340. The processor may include one or more of, for example, a central processing unit, an application processor, a graphic processor, an image signal processor, a sensor hub processor, and a communication processor.

The memory may include, for example, a volatile or nonvolatile memory.

An interface may include a high definition multimedia interface (HDMI), a universal serial bus (USB) interface, a secure digital (SD) card interface, and/or an audio interface. The interface may electrically or physically connect, for example, the electronic device 1 with an external electronic device, and may include an USB connector, an SD card/MMC connector, or an audio connector.

The battery 350 may be a device for supplying power to at least one component of the electronic device 1, and may include, e.g., a primary cell which is not rechargeable, a secondary cell which is rechargeable, or a fuel cell. At least a part of the battery 350 may be arranged on substantially the same plane as, for example, the printed circuit board 340. The battery 350 may be arranged as one piece inside the electronic device 1 or may be arranged removably from the electronic device 1.

The antenna 370 may be arranged between the rear case 330 and the battery 350. The antenna 370 may include, for example, a near field communication (NFC) antenna, a wireless charging antenna, and/or a magnetic secure transmission (MST) antenna. The antenna 370 may perform short-range communication or wirelessly transmit and receive power needed for charging, with, for example, an external device. In an embodiment, an antenna structure may be formed by a part or a combination of the sidewall 310 and/or the support member 320.

Referring to FIGS. 3 through 5, the transparent member 10 may include a first region 101 that is arranged on the front surface of the electronic device 1 to face the display module 20, a second region 102 that is arranged in an edge of the first region 101 and has a certain thickness, and a third region 103 that is opposite to the first region 101. For example, the first region 101 may be provided in the shape of a plane to form a bottom surface of the transparent member 10. However, the disclosure is not limited thereto, and the first region 101 may be provided in the shape of a curved surface to form the bottom surface of the transparent member 10. The second region 102 may form a side portion of the transparent member 10. In this case, the second region 102 may include a first opposing surface 102-1 facing the sidewall 310 of the housing 30 and a second opposing surface 102-2 facing a protruding portion 40. Matters related to the first opposing surface 102-1 and the second opposing surface 102-2 will be described in more detail with reference to FIGS. 5 through 6B. The third region 103 may form a top surface facing an external region of the electronic device 1. The third region 103 may form an exterior of the electronic device 1, and may be provided in a shape corresponding to the first region 101 or in a shape that is different from the first region 101 depending on a design need. The housing 30 may surround an edge of the transparent member 10 and form the exterior of the electronic device 1. According to an embodiment, the housing 30 has the shape of a plane, e.g., a rectangular shape, but the disclosure is not limited thereto. For example, the exterior of the electronic device 1 may have various curved surfaces or may be implemented with a flexible device, and in this case, the housing 30 may be provided to have a shape corresponding to the exterior of the electronic device 1. The housing 30 according to an embodiment may include the sidewall 310 that defines a recess 315 for arranging the transparent member 10 and the display module 20 and the support member 320 for supporting the display module 20.

The sidewall 310 of the housing 30 may be arranged to surround the edge of the second region 102 of the transparent member 10. The sidewall 310 may be formed to extend in a thickness direction (Z direction). However, the disclosure is not limited thereto, and the sidewall 310 may be formed in an inclined shape or a curved shape to correspond to the shape of the second region 102 of the transparent member 10. For example, the sidewall 310 may include a metal material. For example, the metal material may include at least one of stainless steel, an aluminum alloy, or a magnesium alloy. The housing 30 includes a metal material, thereby guaranteeing a certain strength while improving the aesthetic sense of the electronic device 1. However, the disclosure is not limited thereto, and the sidewall 310 may include a non-metal material.

The support member 320 may be arranged inside the electronic device 1 and may be connected with the sidewall 310 or may be formed as one piece with the sidewall 310. The support member 320 according to an embodiment may be coupled with the display module 20 on a surface thereof and with a printed circuit board (not shown) on another surface thereof. A processor, a memory, and/or an interface may be mounted on the printed circuit board. The processor may include one or more of, for example, a central processing unit, an application processor, a graphic processor, an image signal processor, a sensor hub processor, and a communication processor. The support member 320 of the housing 30 according to an embodiment may include a metal material. However, the material of the support member 320 may not be limited thereto. For example, the material of the support member 320 may not include a metal material, but may include a non-metal material, differently from the material of the sidewall 310. The protruding portion 40 may be formed to protrude toward the transparent member 10 from the sidewall 310 of the housing 30. For example, the protruding portion 40 may be formed as one piece with the housing 30 or may be formed as a structure that is separate from the housing 30. For example, the protruding portion 40 may protrude from the sidewall 310 of the housing 30 such that the protruding portion 40 is adjacent to the transparent member 10 in a circumferential direction of the electronic device 1. For example, the protruding portion 40 may be formed to protrude toward the transparent member 10 from the sidewall 310 of the housing 30 by a certain distance K, as shown in FIG. 5. Thus, a distance between the protruding portions 40 arranged with the transparent member 10 therebetween may be less than a width of the transparent member 10 arranged between the protruding portions 40.

For example, the protruding portion 40 may include a first protruding region 41 extending in an up-down direction (Y direction) perpendicular to the thickness direction (Z direction) of the electronic device 1, as shown in FIG. 4B. The first protruding region 41 according to an embodiment may include a first-first protruding region 41-1 and a first-second protruding region 41-2 that protrude from the left and right sidewalls 311 of the housing 30. The first-first protruding region 41-1 and the first-second protruding region 41-2, which protrude from the left and right sidewalls 311 of the housing 30, may be spaced apart from each other with the transparent member 10 therebetween. A space $W_1$ between the first-first protruding region 41-1 and the first-second protruding region 41-2 may be less than a left-right width $L_1$ of the transparent member 10.

The protruding portion 40 may also include a second protruding region 42 extending in a left-right direction (X direction) perpendicular to the thickness direction (Z direction) and the up-down direction (Y direction) of the electronic device 1, as shown in FIG. 4B. The second protruding region 42 according to an embodiment may include a second-first protruding region 42-1 and a second-second protruding region 42-2 that protrude from top and bottom sidewalls 312 of the housing 30. The second-first protruding region 42-1 and the second-second protruding region 42-2, which protrude from the top and bottom sidewalls 312 of the housing 30, may be spaced apart from each other with the transparent member 10 therebetween. A space $W_2$ between the second-first protruding region 42-1 and the second-second protruding region 42-2 may be less than a left-right width $L_2$ of the transparent member 10. In the above-described embodiment of the disclosure, the distance between the protruding portions 40 extending along the sidewall 310 of the housing 30 and width of the transparent member 10 in the up-down direction (Y direction) and the left-right direction (X direction) have been described, but the disclosure is not limited thereto.

When the exterior of the electronic device 1 has various curved surfaces or is implemented as a flexible device, the sidewall 310 of the housing 30 forming the exterior may also be formed to have an arbitrary shape corresponding to the exterior of the electronic device 1. For example, the protruding portion 40 may also protrude from the sidewall 310 of the housing 30 to correspond to the sidewall 310 of the housing 30 having any shape. In this case, the transparent member 10 arranged on the front surface of the electronic device 1 may also correspond to the sidewall 310 of the housing 30 having any shape. The protruding portions 40 according to an embodiment may be spaced apart from each other with the transparent member 10 therebetween, and a distance between the protruding portions 40 spaced apart from each other with the transparent member 10 therebetween may be less than a width of the transparent member 10 arranged between the protruding portions 40.

For example, a top end portion of the protruding portion 40, e.g., a top surface portion 410, may be located higher than the first region 101 of the transparent member 10 in the thickness direction (Z direction). Thus, a step region may be formed between the top surface portion 410 of the protruding portion 40 and the first region 101 of the transparent member 10, and a bonding member moving path T in which a bonding member M is movable may be formed in the step region. A matter related to the bonding member moving path T formed using the protruding portion 40 and the side portion of the transparent member 10 will be described in more detail with reference to FIGS. 5 through 6B.

A transparent member support portion 50 may be a support member supporting the first region 101 of the transparent member 10. For example, the transparent member support portion 50 may be the support member 320 of the housing 30, and may be a support wall structure extending from the support member 320 in the thickness direction (Z direction). For example, the transparent member support portion 50 may be arranged more inwardly from the electronic device 1 than the protruding portion 40 to support the first region 101 of the transparent member 10. In this case, the transparent member support portion 50 may be spaced apart from the protruding portion 40 with a certain space therebetween in the circumferential direction of the electronic device 1.

The transparent member support portion 50 may be formed as one piece with the support member 320 of the housing 30 or may be formed as a structure that is separate from the support member 320 of the housing 30. In this case, the transparent member support portion 50 may continuously extend in the edge direction of the first region 101. However, the disclosure is not limited thereto, and the transparent member support portion 50 may discontinuously extend in the edge direction of the first region 101. A light-blocking layer 51 may be arranged between the transparent member 10 and the transparent member support portion 50 to prevent a leakage of light occurring from the display 120.

A bonding member accommodating portion 55 may be an accommodating space that accommodates the bonding member M capable of coupling the housing 30 with the transparent member 10. For example, the bonding member accommodating portion 55 may be a space formed between the protruding portion 40 and the transparent member support portion 50. Thus, the bonding member accommodating portion 55 may extend in the circumferential direction of the electronic device 1 identically to the extending direction of the protruding portion 40 and the transparent member support portion 50. The bonding member accommodating portion 55 may include a bonding member accommodating surface 550 extending between the protruding portion 40 and the transparent member support portion 50.

The bonding member accommodating groove 56 may be an accommodating space that is located lower than the bonding member accommodating surface 550 in the thickness direction (Z direction) to further accommodate the bonding member M. A matter related to the bonding member accommodating groove 56 will be described later with reference to FIGS. 12A through 12D.

Figure 6A:
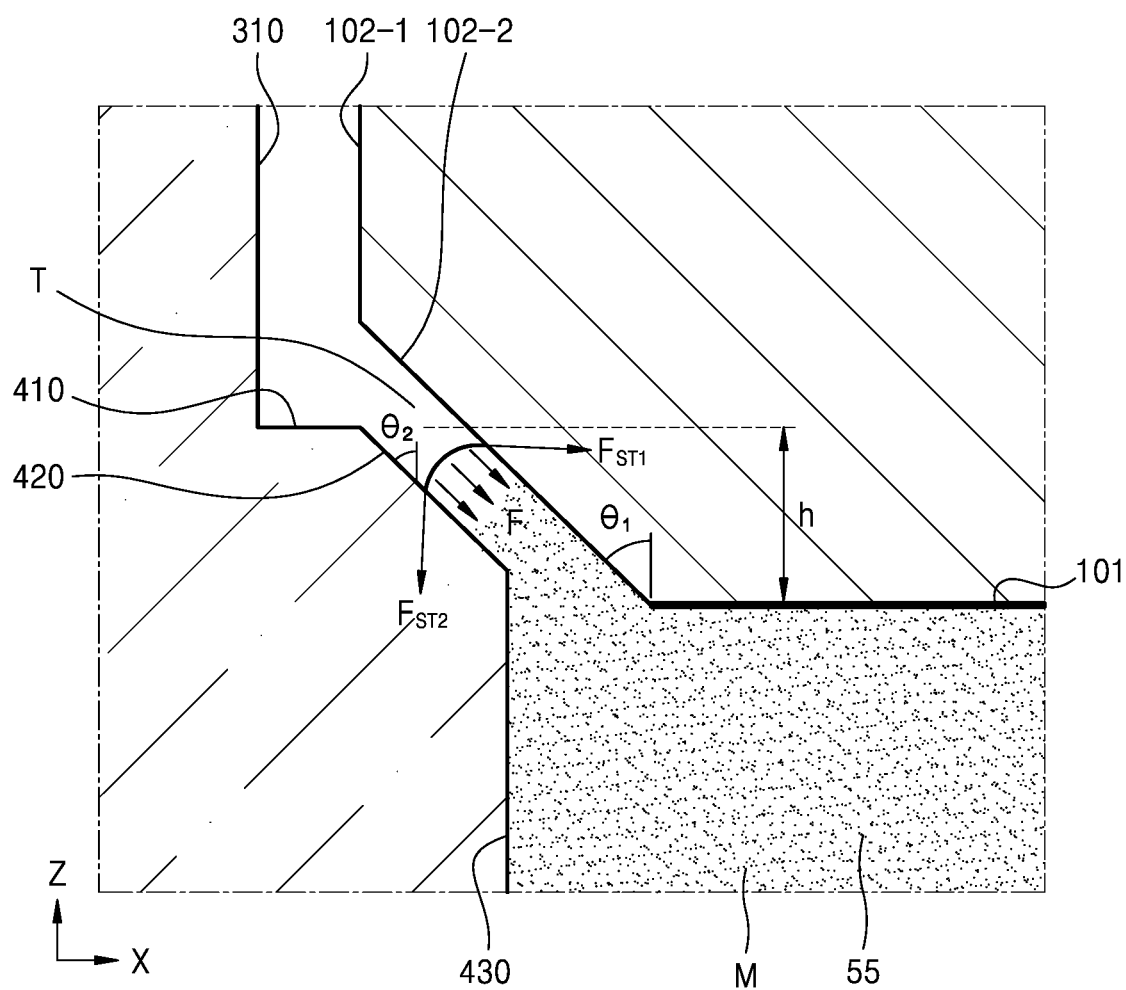
FIG. 6A is a schematic view of a bonding material moving path according to an embodiment.
Figure 6B:
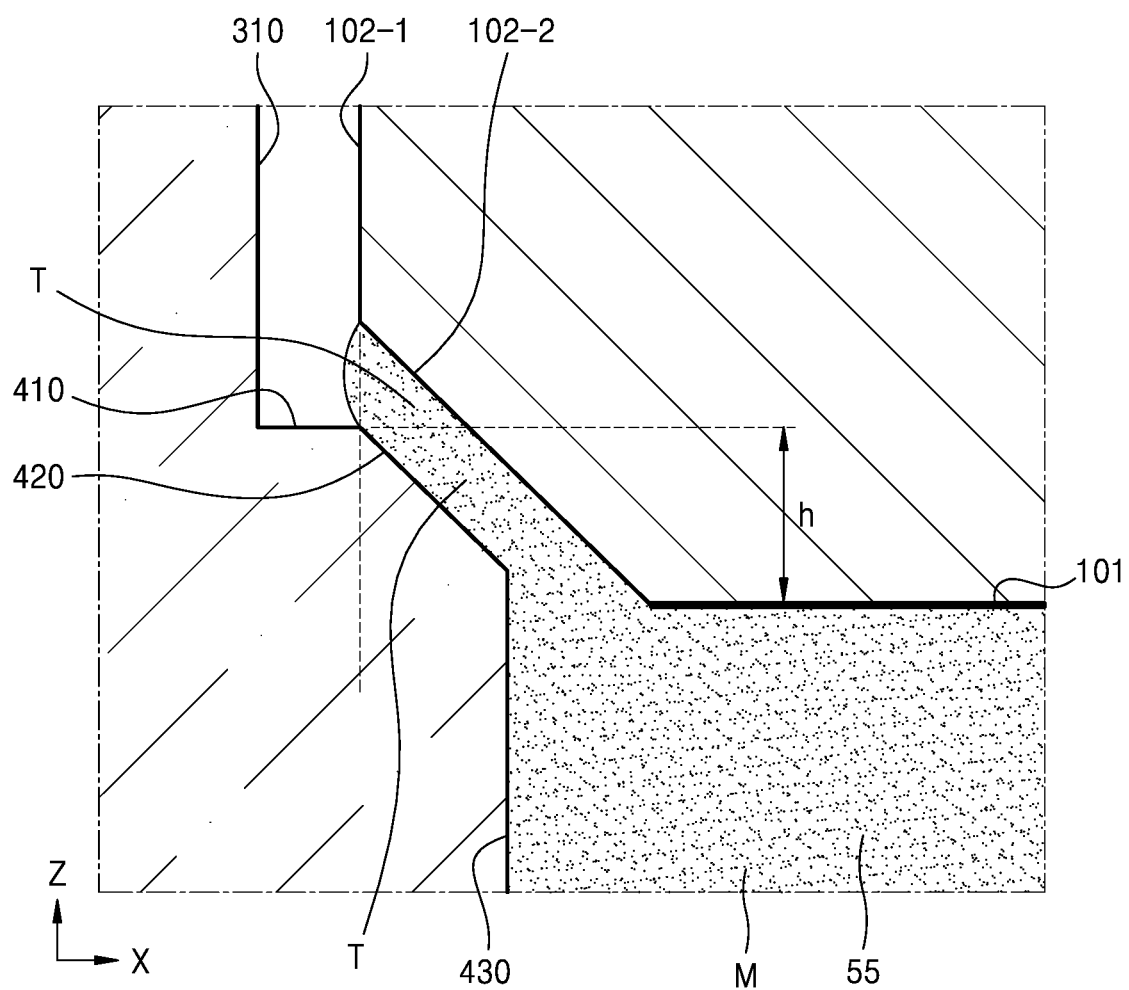
FIG. 6B is a schematic view of a bonding material moving path according to an embodiment.
Figure 7:
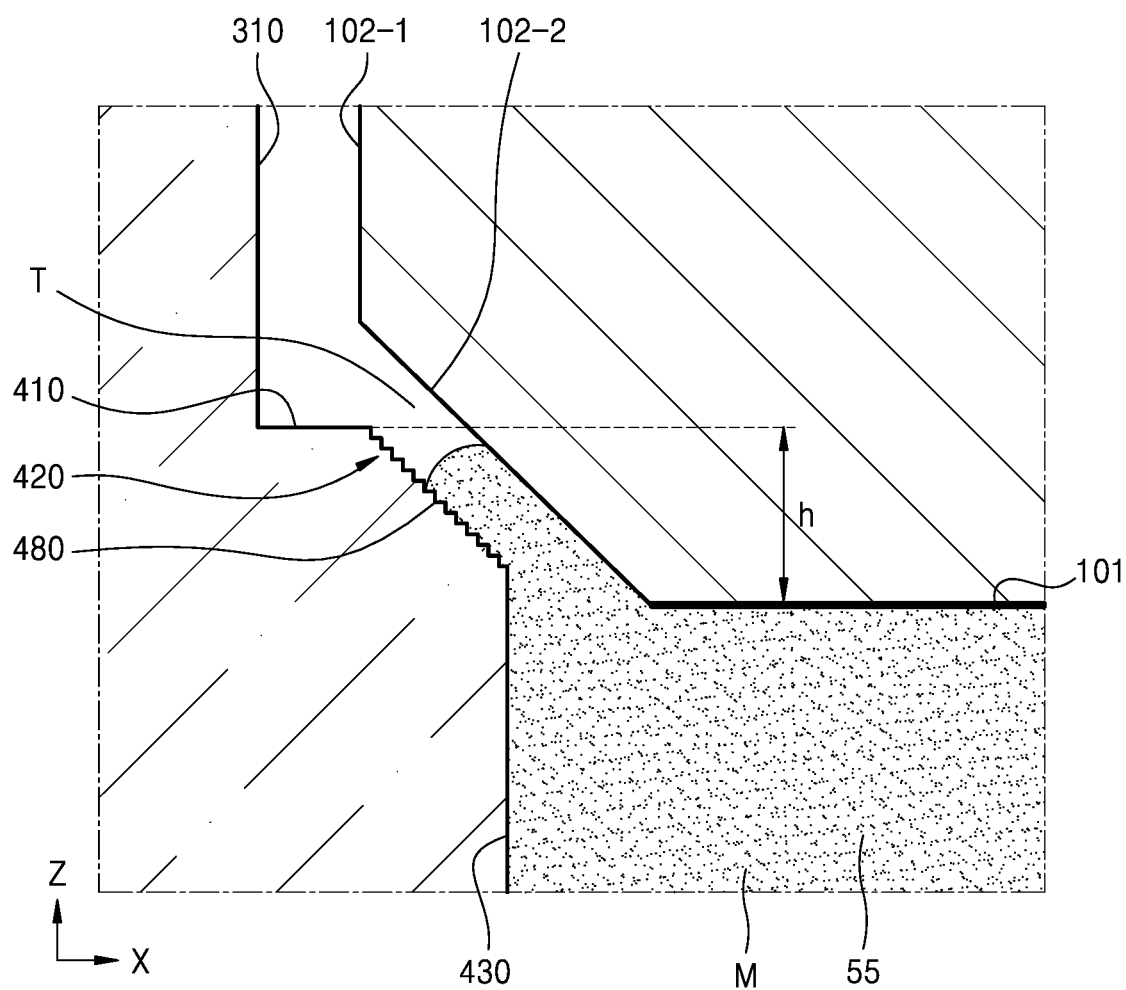
FIG. 7 is a schematic view of a bonding material moving path according to an embodiment.

FIG. 6A is a schematic view of the bonding material moving path T according to an embodiment. FIG. 6B is a schematic view of the bonding material moving path T according to an embodiment. FIG. 7 is a schematic view of the bonding material moving path T according to an embodiment.

Referring to FIGS. 5 and 6A, the protruding portion 40 according to an embodiment may include the top surface portion 410 arranged on the top end portion in the thickness direction (Z direction), an inclined surface 420 facing the second opposing surface 102-2, and a side surface portion 430 extending in the thickness direction (Z direction).

The top surface portion 410, as an upper region of the protruding portion 40, may be formed as a plane or a curved surface which connects the top end portion of the protruding portion 40 with the sidewall 310 of the housing 30. For example, the top surface portion 410 may be located higher than the first region 101 of the transparent member 10 in the thickness direction (Z direction). Thus, a step region h corresponding to a height difference may be generated between the top surface portion 410 and the first region 101 of the transparent member 10.

The inclined surface 420 may face the second opposing surface 102-2 of the transparent member 10 with a certain space therebetween. For example, the inclined surface 420 may be provided in a shape corresponding to the second opposing surface 102-2. For example, when the second opposing surface 102-2 is a sloped surface forming a first angle $\theta_1$ in the thickness direction (Z direction), the inclined surface 420 may be formed as a sloped surface forming a second angle $\theta_2$ that is equal to or different from the first angle $\theta_1$ in the thickness direction (Z direction). For example, the inclined surface 420 and the second opposing surface 102-2 of the transparent member 10 may form the bonding member moving path T in which the bonding member M is movable. In this case, the bonding member moving path T in which the bonding member M is movable may be arranged in the step region h provided between the top surface portion 410 of the protruding portion 40 and the first region 101 of the transparent member 10.

For example, when the bonding member M receives a pressure and leaves the bonding member accommodating portion 55 in a process of bonding between the housing 30 and the transparent member 10, the bonding member M may move in the bonding member moving path T. When the bonding member moving path T in which the bonding member M is movable is arranged in the step region h having a certain height difference, the bonding member M may receive a force to be re-accommodated in the bonding member accommodating portion 55 by gravity.

In addition, for example, a resultant force F corresponding to surface tensions $F_{ST1}$ and $F_{ST2}$ is formed toward the bonding member accommodating portion 55 in the bonding member moving path T, such that the bonding member M may receive a force to be re-accommodated in the bonding member accommodating portion 55.

For example, as shown in FIG. 6B, when the bonding member M is arranged in an end portion of the bonding member moving path T, the bonding member M may be prevented from moving to the top surface portion 410 due to a surface tension.

For example, as shown in FIG. 7, by further arranging a plurality of projection portions 480 capable of increasing a frictional force on a surface of the bonding member moving path T in which the bonding member M is movable, the bonding member M may be prevented from leaving the bonding member accommodating portion 55. For example, the plurality of projection portions 480 may be arranged along a surface of the inclined surface 420, but the disclosure is not limited thereto. The plurality of projection portions 480 may be arranged on the second opposing surface 102-2 to increase a frictional force with the bonding member M. The plurality of projection portions 480 may be provided in any shape and size capable of increasing a frictional force with the bonding member M. However, the disclosure is not limited thereto, and other members capable of increasing a frictional force may be arranged on a surface of the bonding member moving path T in which the bonding member M is movable.

For example, a frictional force may be increased by coating a frictional material (not shown) capable of increasing the frictional force on a surface of the bonding member moving path T in which the bonding member M is movable. The frictional material (not shown) may include a friction adjustment material capable of increasing a frictional force with the bonding member M. For example, the frictional material may be arranged on one or more of the inclined surface 420 and the second opposing surface 102-2. For example, the frictional material may be arranged on the second opposing surface 102-2, and the frictional material arranged on the second opposing surface 102-2 may include a friction adjustment material including a composition that is heterogeneous from printing ink that may be arranged on the first region 101 or a friction adjustment material including a composition that is homogeneous to the printing ink that may be arranged on the first region 101, but having a different composition ratio. For example, the friction adjustment material including the homogeneous composition or having the different composition ratio may include a material having a higher surface energy, a higher water repellency, or a greater color particle than the printing ink that may be arranged on the first region 101. Thus, the frictional material arranged on the second opposing surface 102-2 may increase a frictional force with the bonding member M, and prevent the bonding member M from moving in the bonding member moving path T.

As described above, when the bonding member moving path T is arranged in the step region h, a longer moving path may be provided than a moving path formed on a plane region having no certain height difference between the top end portion of the protruding portion 40 and the first region 101 of the transparent member 10. Thus, in a tendency that a bonding region C (see FIG. 4C) between the housing 30 and the transparent member 10 becomes narrower to satisfy consumers' demands, the bonding member moving path T formed in the step region h according to an embodiment may provide a space in which the bonding member M is further accommodated, and may provide a force for re-accommodating the bonding member M in the bonding member accommodating portion 55. Moreover, as the bonding member M does not move beyond the top surface portion 410, the bonding member M may not be visually identified from outside, thus guaranteeing an aesthetic effect.

Figure 8:
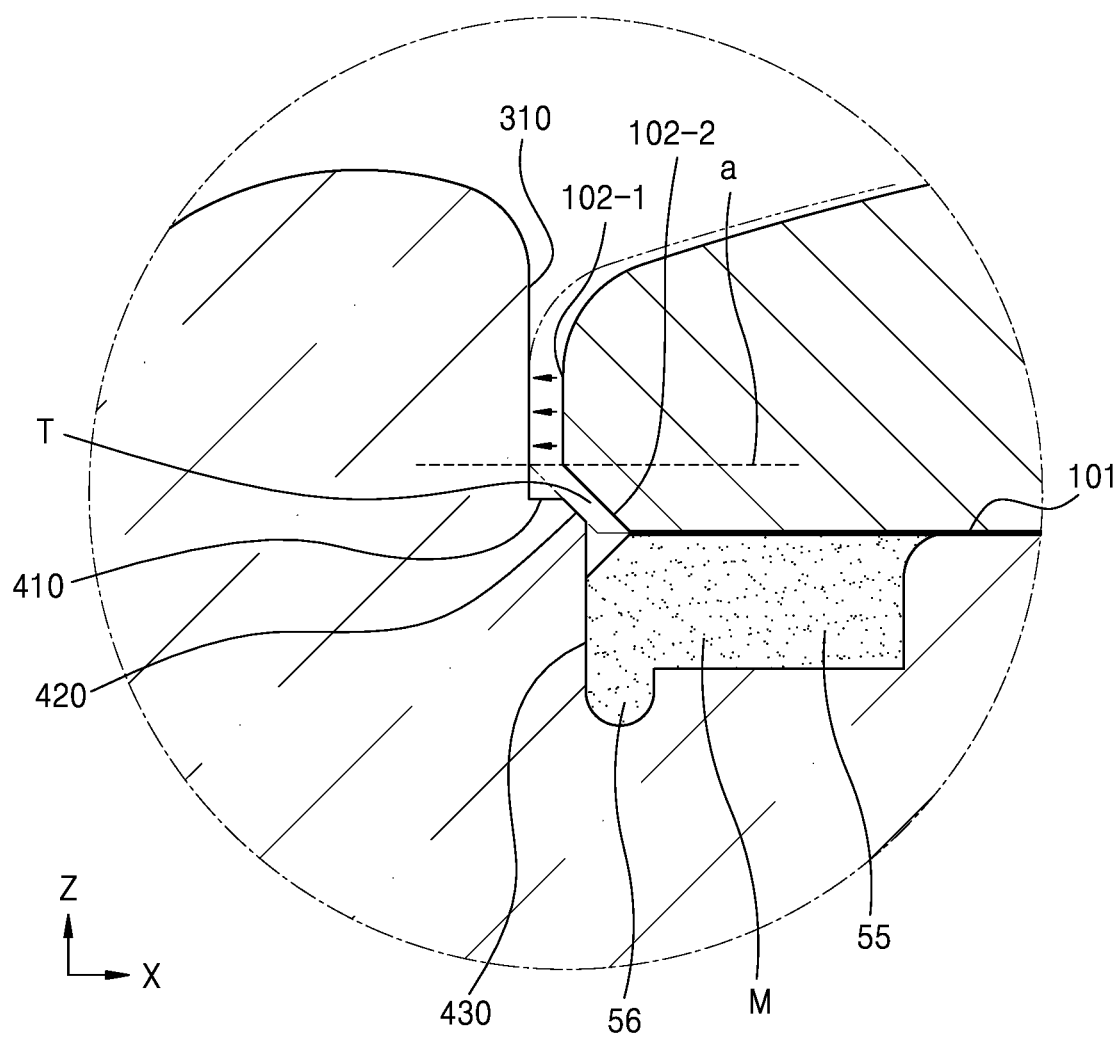
FIG. 8 is a cross-sectional view showing a state before and a state after movement of a transparent member, according to an embodiment.

FIG. 8 is a cross-sectional view showing a state before and a state after movement of the transparent member 10, according to an embodiment.

The thickness-direction (Z-direction) movement of the transparent member 10 coupled with the housing 30 may be confined by the transparent member support portion 50, but horizontal (X-Y plane) movement may occur in a process of bonding between the housing 30 using the bonding member M and the transparent member 10. When horizontal (X-Y plane) movement of the transparent member 10 occurs, the second region 102 of the transparent member 10 may be damaged. For convenience, in the disclosure, a description will be made based on left-right direction (X direction) movement of the transparent member 10.

Referring to FIG. 8, to prevent a damage of the transparent member 10 that may occur when the transparent member 10 moves in the left-right direction (X direction), the top end portion of the protruding portion 40 according to an embodiment may be arranged at a position that is the same as or lower than a bottom end portion of the first opposing surface 102-1. For example, when the top end portion of the protruding portion 40 is the top surface portion 410, the bottom end portion of the first opposing surface 102-1 may be a virtual line a that is a boundary region between the first opposing surface 102-1 and the second opposing surface 102-2. In this case, a height of the top end portion of the protruding portion 40 in the thickness direction (Z direction) may be under the virtual line (a). Thus, when the transparent member 10 moves to the left, the first opposing surface 102-1 of the transparent member 10 may be supported to contact the sidewall 310 of the housing 30 corresponding to the shape of the first opposing surface 102-1. Also, the second opposing surface 102-2 of the transparent member 10 may be supported to contact the inclined surface 420 of the protruding portion 40 corresponding to the shape of the second opposing surface 102-2.

As described above, as the first opposing surface 102-1 and the second opposing surface 102-2 of the transparent member 10 are supported by the sidewall 310 of the housing 30 and the inclined surface 420 of the protruding portion 40, respectively, the second region 102 of the transparent member 10 may surface-contact them. Consequently, it is possible to prevent a pressure from being concentrated on a particular region due to point-contact of the particular region of the transparent member 10 with other support members, thereby preventing a damage of the transparent member 10.

However, the second opposing surface 102-2 of the transparent member 10 and the shape of the inclined surface 420 of the protruding portion 40 are not necessarily formed to correspond to each other. The second opposing surface 102-2 of the transparent member 10 and the inclined surface 420 of the protruding portion 40 may be provided in shapes that do not correspond to each other, and in this case, the inclined surface 420 of the protruding portion 40 may be arranged inwardly from a certain boundary region to prevent a damage of the transparent member 10. Below, a case where the second opposing surface 102-2 of the transparent member 10 and the inclined surface 420 of the protruding portion 40 do not correspond to each other, and the inclined surface 420 of the protruding portion 40 arranged inwardly from the certain boundary region in that case will be described.

Figure 9:
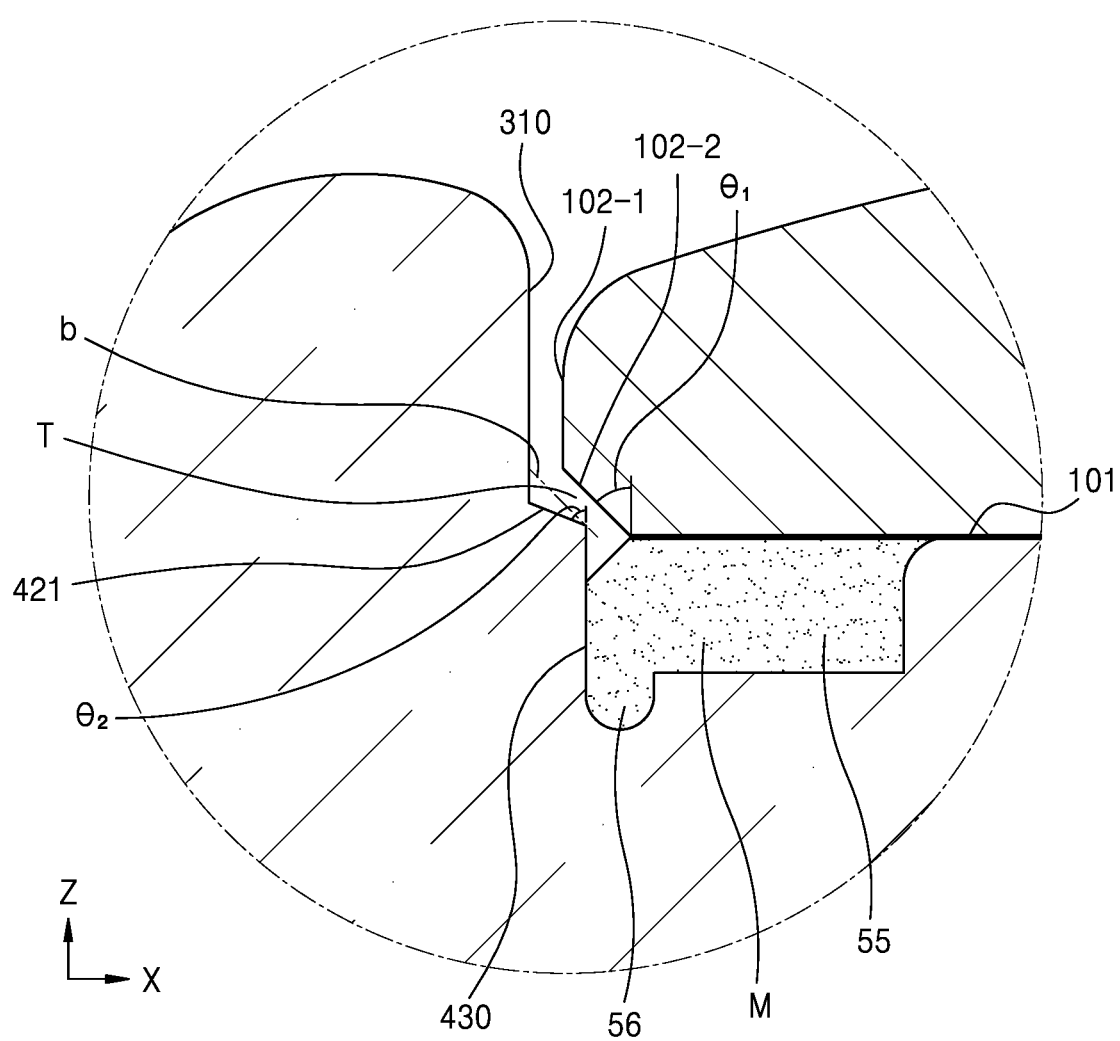
FIG. 9 is a cross-sectional view of a housing and a transparent member, according to an embodiment.
Figure 10:
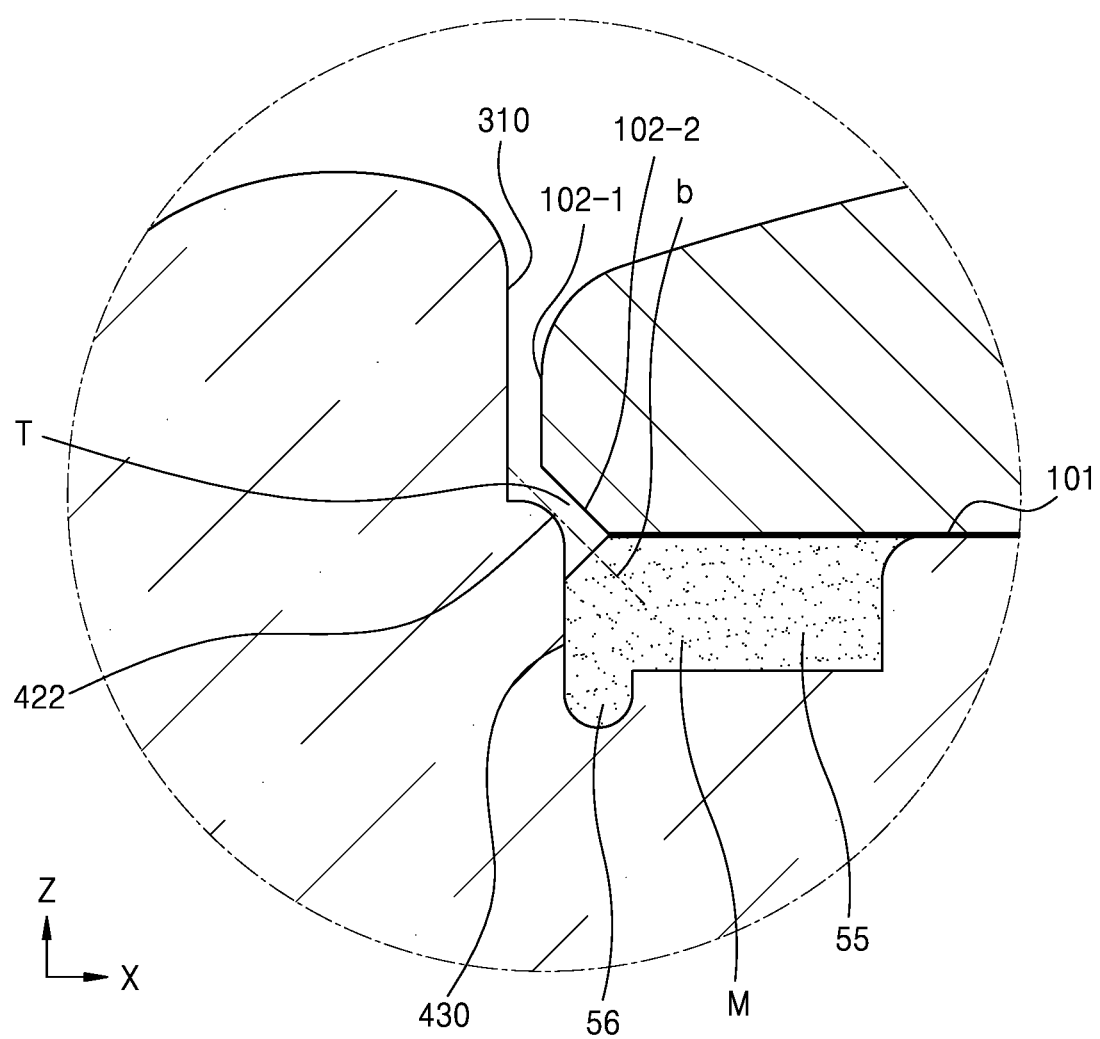
FIG. 10 is a cross-sectional view of a housing and a transparent member, according to an embodiment.
Figure 11A:
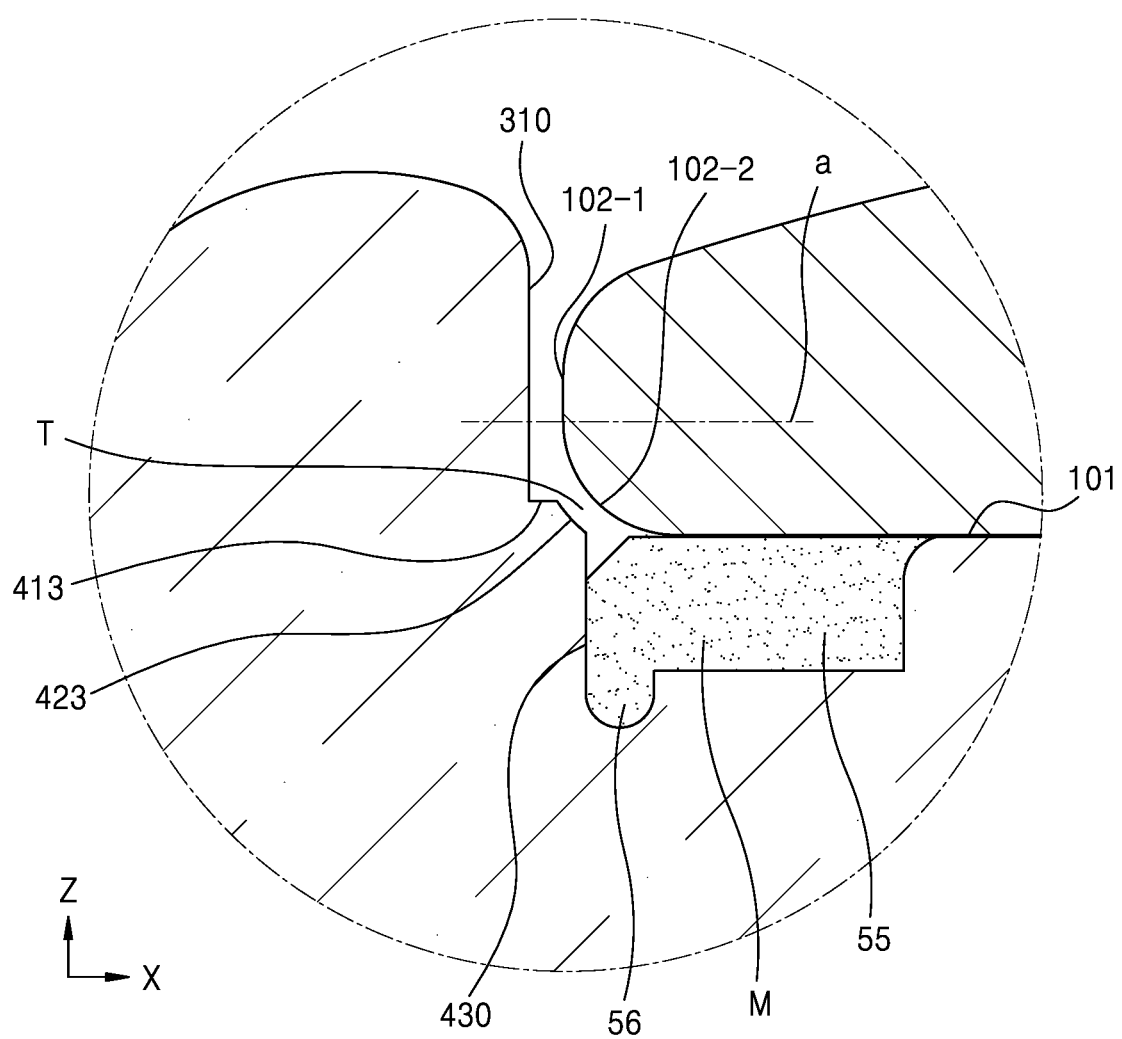
FIG. 11A is a cross-sectional view of a housing and a transparent member, according to an embodiment.
Figure 11B:
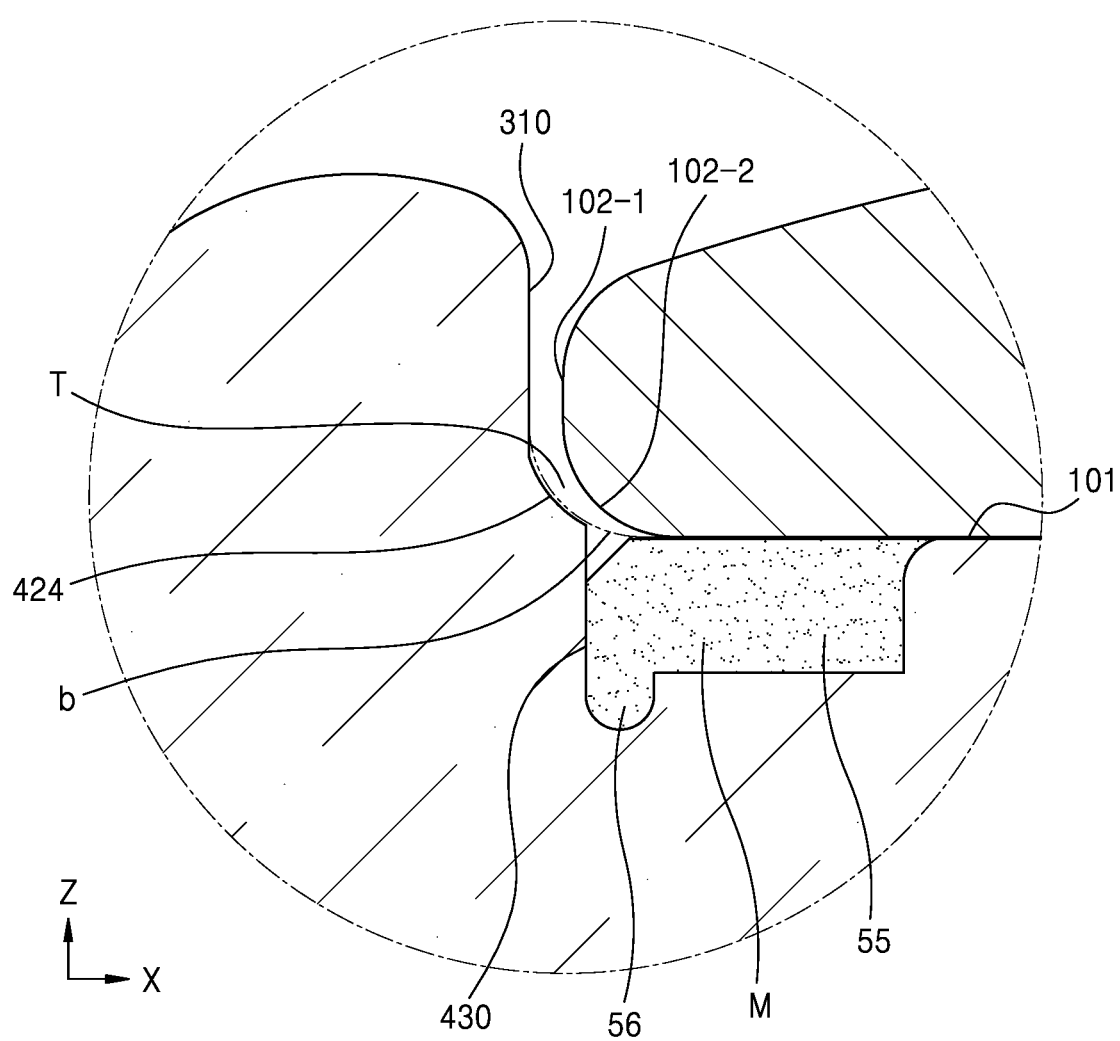
FIG. 11B is a cross-sectional view of a housing and a transparent member, according to an embodiment.

FIG. 9 is a cross-sectional view of the housing 30 and the transparent member 10, according to an embodiment. FIG. 10 is a cross-sectional view of the housing 30 and the transparent member 10, according to an embodiment. FIGS. 11A and 11B are cross-sectional views of housings 30 and transparent members 10, according to other embodiments of the disclosure.

Referring to FIG. 9, when the second opposing surface 102-2 according to an embodiment is a sloped surface forming the first angle $\theta_1$ in the thickness direction (Z direction), the inclined surface 421 may be formed as a sloped surface forming the second angle $\theta_2$ that is different from the first angle $\theta_1$ in the thickness direction (Z direction). In this case, the inclined surface 421 of the protruding portion 40 may be arranged inwardly from a virtual plane (b) extending in parallel with a sloped surface of the second opposing surface 102-2. For example, the inclined surface 421 of the protruding portion 40 may be under the virtual plane (b) in the thickness direction (Z direction). Thus, when the transparent member 10 moves in the horizontal direction (XY plane), the first opposing surface 102-1 of the transparent member 10 may be supported by the sidewall 310 of the housing 30, thereby preventing a damage of the transparent member 10.

Referring to FIG. 10, an opposing surface of the protruding portion 40 facing the second opposing surface 102-2 according to an embodiment may be formed as a curved surface 422. In this case, the curved surface 422 of the protruding portion 40 may be arranged inwardly from the virtual plane (b) extending in parallel with the sloped surface of the second opposing surface 102-2. For example, the curved surface 422 of the protruding portion 40 may be under the virtual plane (b) in the thickness direction (Z direction). Thus, when the transparent member 10 moves in the horizontal direction (XY plane), the first opposing surface 102-1 of the transparent member 10 may be supported by the sidewall 310 of the housing, thereby preventing a damage of the transparent member 10.

Referring to FIG. 11A, the second opposing surface 102-2 according to an embodiment may be formed as a curved surface having a certain curvature. In this case, the opposing surface of the protruding portion 40 facing the second opposing surface 102-2 may be formed as a curved surface 423 having the same curvature as the second opposing surface 102-2. A top surface portion 413 connected with the sidewall 310 may be arranged above the curved surface 423. In this case, the top surface portion 413 may be located higher than the first region 101 of the transparent member 10 in the thickness direction (Z direction), and may be arranged under the virtual line (a) that is a boundary region between the first opposing surface 102-1 and the second opposing surface 102-2.

Referring to FIG. 11B, the second opposing surface 102-2 according to an embodiment may be formed as a curved surface having a certain curvature. In this case, the opposing surface of the protruding portion 40 facing the second opposing surface 102-2 may be formed as a curved surface 424 having a curvature that is different from the second opposing surface 102-2. In this case, the curved surface 424 of the protruding portion 40 may be arranged inwardly from the virtual plane (b) extending in parallel with the curved surface of the second opposing surface 102-2. For example, the curved surface 424 of the protruding portion 40 may be under the virtual plane (b) in the thickness direction (Z direction).

FIGS. 12A, 12B, 12C, and 12D are cross-sectional views of housings 30 including different bonding member accommodating grooves 56 and transparent members 10.

Referring to FIGS. 12A through 12D, the bonding member accommodating portion 55 may include a bonding member accommodating surface 550 extending between the protruding portion 40 and the transparent member support portion 50. The bonding member accommodating groove 56 may be located lower than the bonding member accommodating surface 550 in the thickness direction (Z direction) to further accommodate the bonding member M. For example, the bonding member accommodating groove 56 may extend in the circumferential direction of the transparent member 10. In this case, a cross section of the bonding member accommodating groove 56 may have one or more of a triangular shape, a rectangular shape, and a semi-circular shape.

Figure 12A:
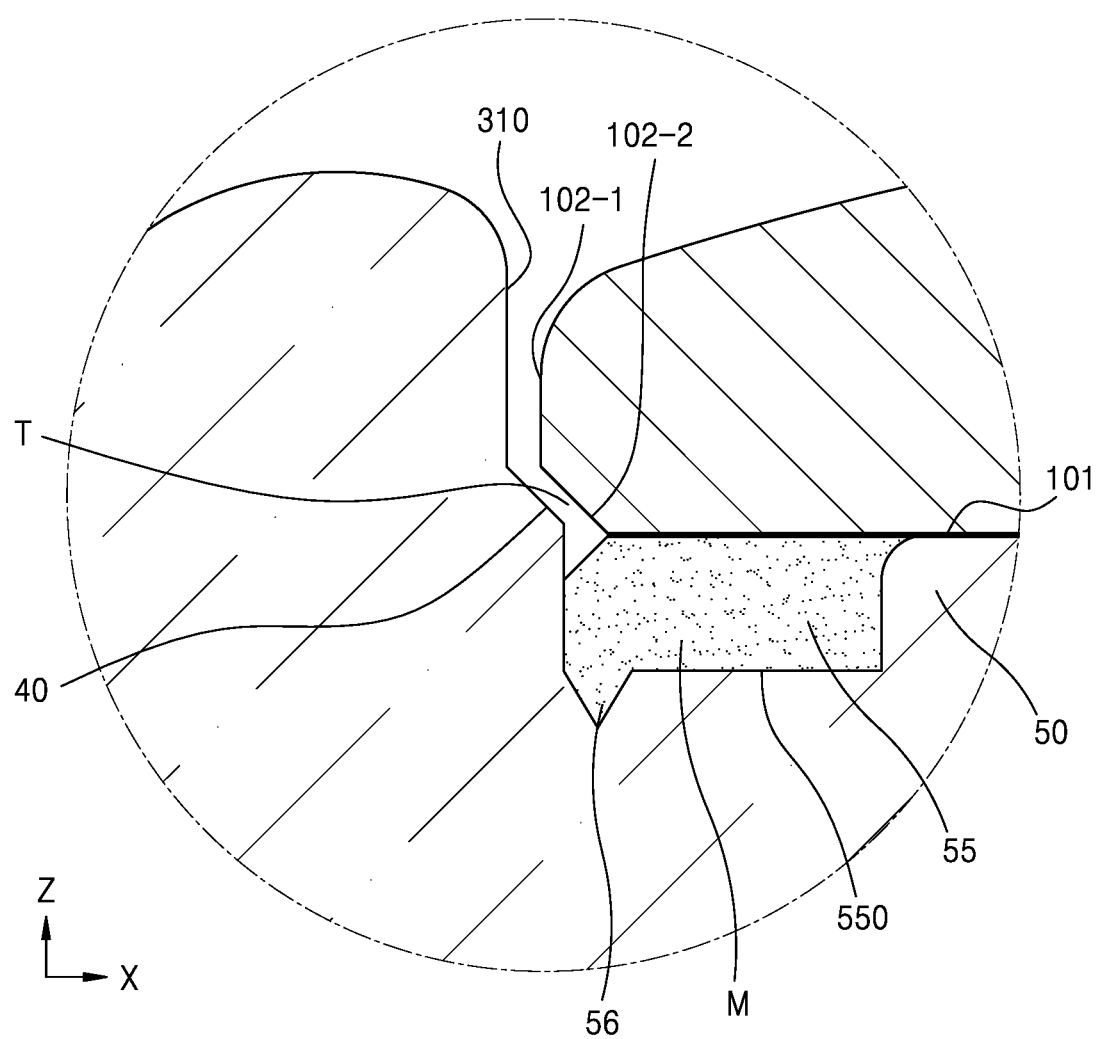
FIG. 12A is a cross-sectional view of a housing including different bonding member accommodating grooves and a transparent member, according to an embodiment.
Figure 12B:
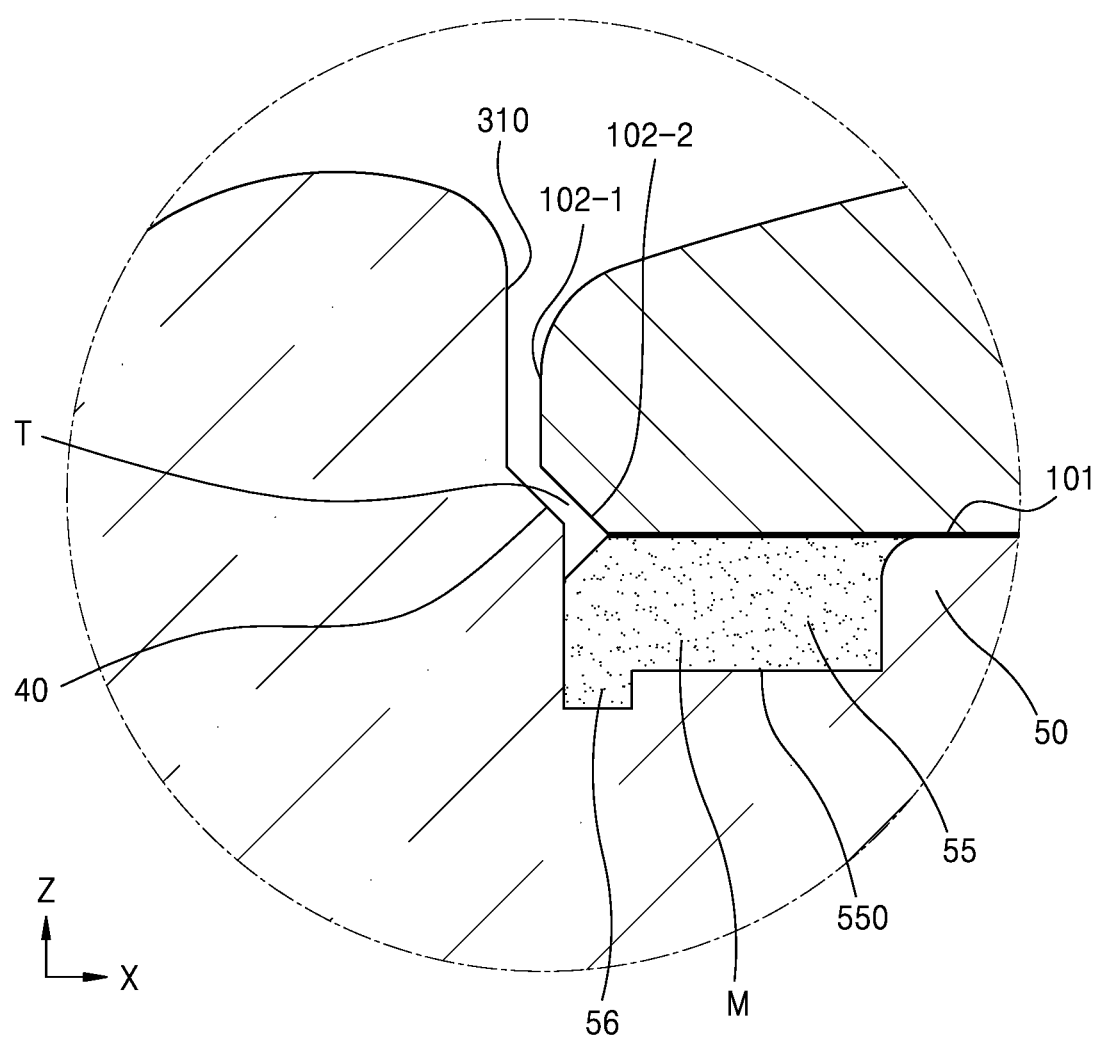
FIG. 12B is a cross-sectional view of a housing including different bonding member accommodating grooves and a transparent member, according to an embodiment.
Figure 12C:
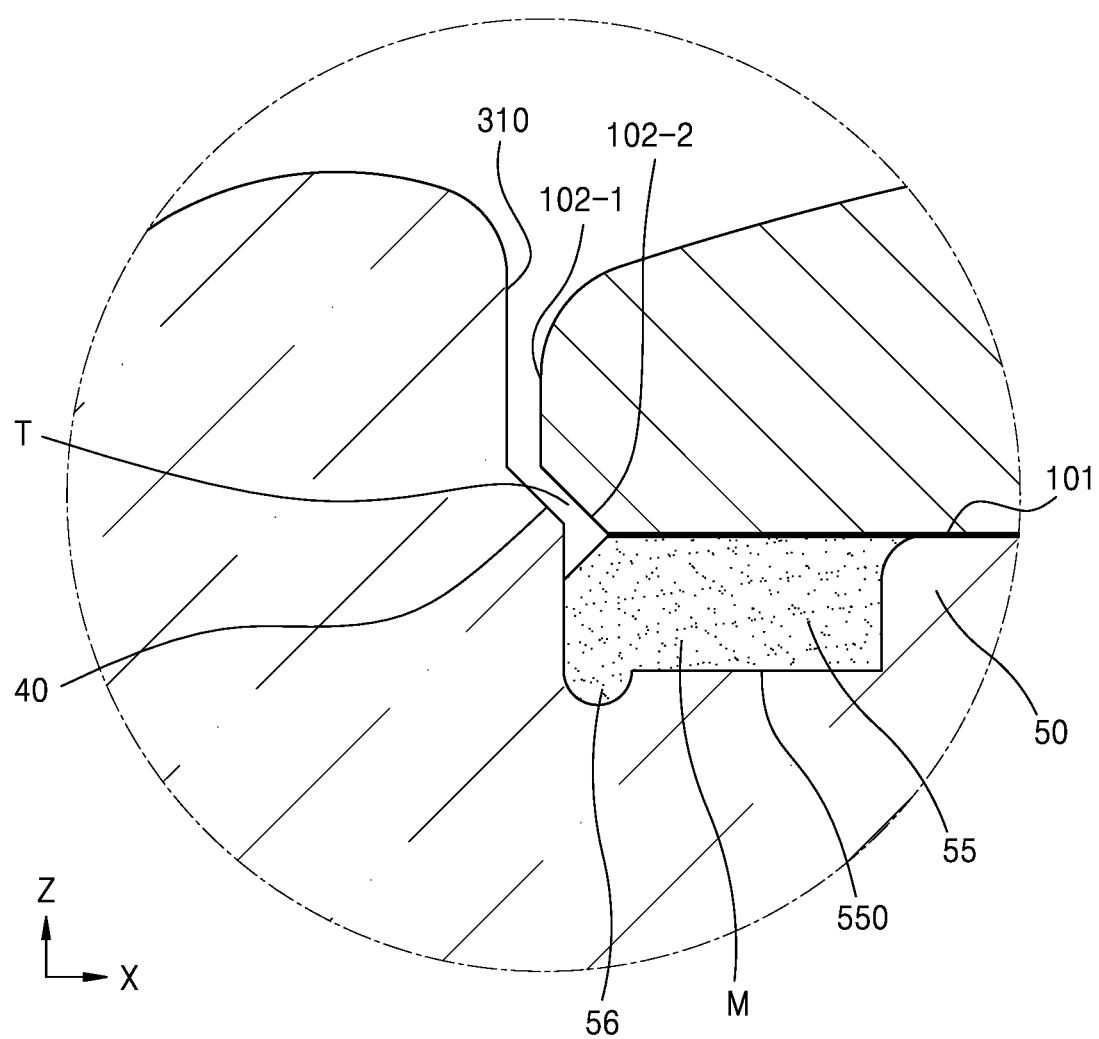
FIG. 12C is a cross-sectional view of a housing including different bonding member accommodating grooves and a transparent member, according to an embodiment.
Figure 12D:
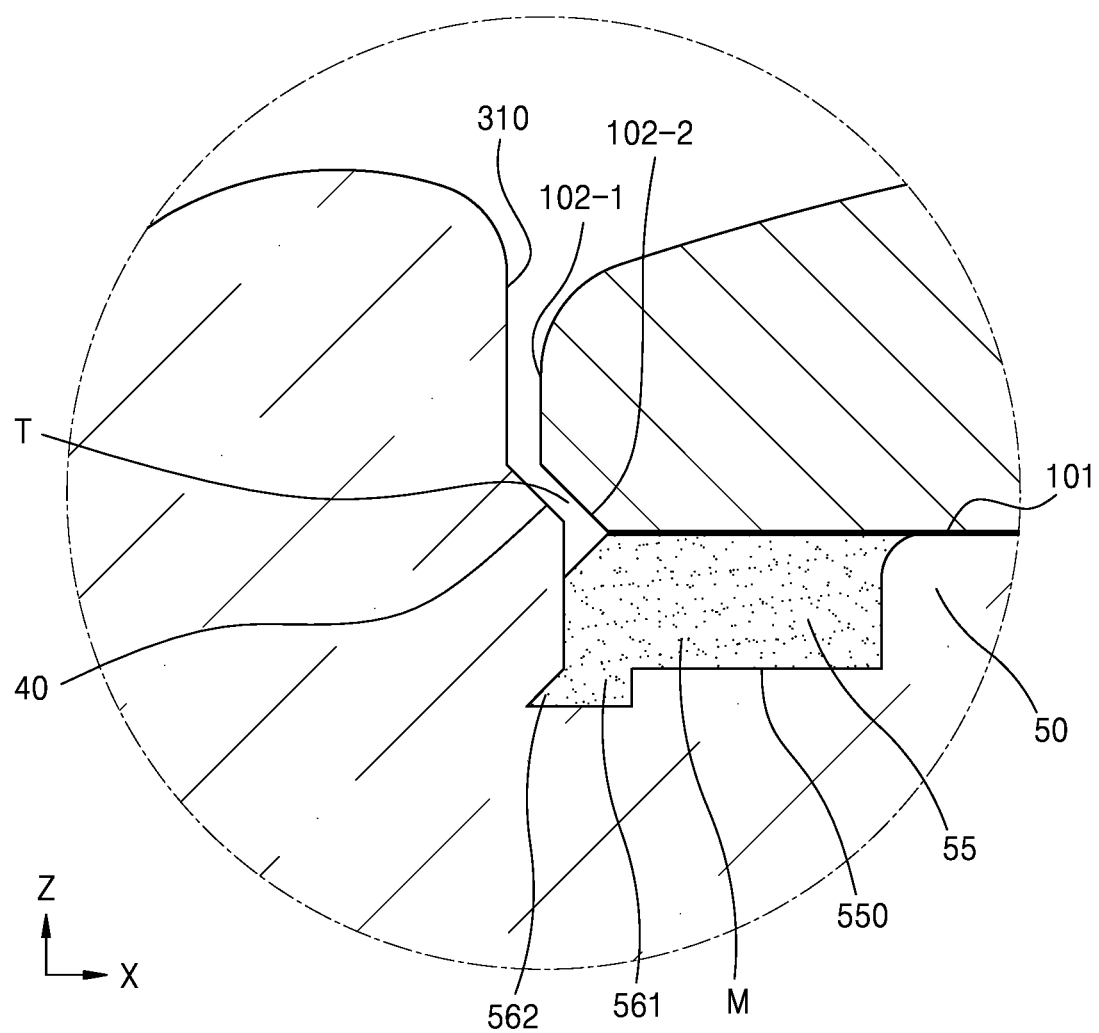
FIG. 12D is a cross-sectional view of a housing including different bonding member accommodating grooves and a transparent member, according to an embodiment.

Referring to FIG. 12D, the bonding member accommodating groove 56 may extend to a lower region of the protruding portion 40. For example, the bonding member accommodating groove 56 may include a first accommodating groove region 561 located lower than the bonding member accommodating surface 550 in the thickness direction (Z direction) and a second accommodating groove region 562 located lower than the protruding portion 40 in the thickness direction (Z direction). As an accommodating region of the bonding member M extends to the lower region of the protruding portion 40, the bonding member M may be further accommodated without forming the bonding member accommodating groove 56 deep.

The electronic device according to an embodiment may improve a strength of coupling between window glass and a housing while providing an aesthetic sense.

While embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic device comprising:
    a transparent member arranged on at least one of a front surface or a rear surface of the electronic device and comprising a first region facing a display module;
    a housing which surrounds the transparent member, comprises a sidewall extending in a circumferential direction of the electronic device, and forms an exterior of the electronic device;
    protruding portions which protrude toward the transparent member from the sidewall and extend in the circumferential direction of the electronic device;
    a transparent member support portion extending in a circumferential direction of the transparent member and supporting the first region of the transparent member; and
    a bonding member accommodating portion located between the protruding portions and the transparent member support portion to accommodate a bonding member,
    wherein a distance between the protruding portions facing each other with the transparent member therebetween is less than a width of the transparent member arranged between the protruding portions, and
    top end portions of the protruding portions are located higher than the first region of the transparent member in a thickness direction of the electronic device.

2. The electronic device of claim 1, wherein the protruding portions comprise first protruding regions extending in an up-down direction of the electronic device, the up-down direction being perpendicular to the thickness direction of the electronic device,
    the transparent member comprises a left-right width extending in a left-right direction that is perpendicular to the thickness direction of the electronic device and the up-down direction of the electronic device, and
    a distance between the first protruding regions facing each other with the transparent member therebetween is less than the left-right width of the transparent member.

3. The electronic device of claim 1, wherein the protruding portions comprise second protruding regions extending in a left-right direction of the electronic device, the left-right direction being perpendicular to the thickness direction of the electronic device,
    the transparent member comprises an up-down width extending in an up-down direction that is perpendicular to the thickness direction of the electronic device and the left-right direction of the electronic device, and
    a distance between the second protruding regions facing each other with the transparent member therebetween is less than the up-down width of the transparent member.

4. The electronic device of claim 1, wherein the transparent member comprises a second region arranged in an edge of the first region and comprising a certain thickness, and
    the second region of the transparent member comprises a first opposing surface facing the sidewall and a second opposing surface facing the protruding portions.

5. The electronic device of claim 4, further comprising a moving path located between the second opposing surface and the protruding portions and in which the bonding member moves,
    wherein the moving path is located in a step region between the top end portions of the protruding portions and the first region of the transparent member.

6. The electronic device of claim 4, wherein the top end portions of the protruding portions are located at same positions as or lower than a bottom end portion of the first opposing surface in the thickness direction of the electronic device.

7. The electronic device of claim 4, wherein the second opposing surface is a sloped surface forming a certain angle with respect to a front or a rear of the electronic device, and
the protruding portions comprise inclined surfaces opposite to the second opposing surface.

8. The electronic device of claim 7, wherein inclinations of the second opposing surface and the inclined surfaces with respect to the front or the rear of the electronic device are the same as or different from each other.

9. The electronic device of claim 4, wherein the second opposing surface is a sloped surface forming a certain angle with respect to the front or the rear of the electronic device, and
the protruding portions comprise curved surfaces opposite to the second opposing surface.

10. The electronic device of claim 9, wherein the curved surfaces are located under a virtual plane extending in parallel with the sloped surface.

11. The electronic device of claim 4, wherein the second opposing surface is a curved surface comprising a certain curvature, and
the protruding portions comprise curved surfaces opposite to the second opposing surface.

12. The electronic device of claim 11, wherein a curvature of the second opposing surface is the same as or different from a curvature of the curved surfaces of the protruding portions.

13. The electronic device of claim 7, further comprising a plurality of projection portions arranged on one or more of the second opposing surface and the inclined surfaces.

14. The electronic device of claim 7, further comprising a coating portion arranged on one or more of the second opposing surface and the inclined surfaces to increase a frictional force with the bonding member.

15. The electronic device of claim 7, wherein the top end portions of the protruding portions comprise top surface portions of planar shapes, respectively, that are connected to the sidewall and top end portions of the inclined surfaces.

16. The electronic device of claim 1, wherein the bonding member accommodating portion comprises:
a bonding member accommodating surface located lower than the transparent member in the thickness direction of the electronic device; and
a bonding member accommodating groove located lower than the bonding member accommodating surface in the thickness direction of the electronic device.

17. The electronic device of claim 16, wherein the bonding member accommodating groove comprises:
a first accommodating groove region located lower than the bonding member accommodating surface in the thickness direction of the electronic device; and
a second accommodating groove region located lower than the protruding portions in the thickness direction of the electronic device.

18. The electronic device of claim 17, wherein a cross-section of the bonding member accommodating groove comprises one or more of a triangular shape, a rectangular shape, and a semi-circular shape.

19. The electronic device of claim 1, wherein the sidewall covers the transparent member from an outside, and
each of the top end portions of each of the protruding portions is formed as a planar surface connected to the sidewall to form a step with respect to the sidewall.

* * * * *